(12) United States Patent
Koshiyama

(10) Patent No.: US 8,381,029 B2
(45) Date of Patent: Feb. 19, 2013

(54) PROCESSING METHOD, STORAGE SYSTEM, INFORMATION PROCESSING APPARATUS, AND COMPUTER-READABLE STORAGE MEDIUM STORING PROGRAM

(75) Inventor: Yuichi Koshiyama, Kahoku (JP)

(73) Assignee: Fujistu Limited, Kawasaki (JP)

( * ) Notice: Subject to any disclaimer, the term of this patent is extended or adjusted under 35 U.S.C. 154(b) by 338 days.

(21) Appl. No.: 12/900,381

(22) Filed: Oct. 7, 2010

(65) Prior Publication Data

US 2011/0087929 A1    Apr. 14, 2011

(30) Foreign Application Priority Data

Oct. 9, 2009   (JP) .................................. 2009-235181

(51) Int. Cl.
*G06F 11/00* (2006.01)
(52) U.S. Cl. ............................................. 714/15; 714/3
(58) Field of Classification Search ................... 71/15, 3, 71/12, 13, 20, 48, 718; 711/100, 133, 156
See application file for complete search history.

(56) References Cited

U.S. PATENT DOCUMENTS

| | | | |
|---|---|---|---|
| 7,219,208 B2 | 5/2007 | Nagashima et al. | |
| 7,240,153 B2 | 7/2007 | Taninaka et al. | |
| 7,305,462 B2 | 12/2007 | Nakamura et al. | |
| 7,962,455 B2 * | 6/2011 | Erofeev | 707/672 |
| 8,121,983 B2 * | 2/2012 | Prahlad et al. | 707/661 |
| 8,271,830 B2 * | 9/2012 | Erofeev | 714/6.23 |
| 2003/0065902 A1 | 4/2003 | Shiga et al. | |

FOREIGN PATENT DOCUMENTS

| | | |
|---|---|---|
| JP | 2003-108412 | 4/2003 |
| JP | 2003-108420 | 4/2003 |
| JP | 2005-250927 | 9/2005 |
| JP | 2005-284478 | 10/2005 |

* cited by examiner

*Primary Examiner* — Dieu-Minh Le
(74) *Attorney, Agent, or Firm* — Fujitsu Patent Center

(57) ABSTRACT

A first information processing apparatus of multiple information processing apparatuses includes a second configuration information storage section storing second configuration information; a first configuration information modification section modifying first configuration information in the storage apparatus; a notification section notifying, a second information processing apparatus, of modified part information indicating a modified part in the first configuration information; a modified part information storage section storing the modified part information from the second information processing apparatus; and an updating section updating, before modifying the first configuration information in the storage apparatus, the modified part in the second configuration information indicated by the modified part information stored in the modified part information storage section, based on the first configuration information. Thus, when modifying setting on the storage apparatus from multiple information processing apparatuses, the integrity of the configurations is maintained, and the system can be deployed and operated at lower costs.

8 Claims, 22 Drawing Sheets

— 1 —
PROCESSING METHOD, STORAGE SYSTEM, INFORMATION PROCESSING APPARATUS, AND COMPUTER-READABLE STORAGE MEDIUM STORING PROGRAM

CROSS-REFERENCE TO RELATED APPLICATIONS

This application is based upon and claims the benefit of priority of the prior Japanese Patent Application No. 2009-235181, filed on Oct. 9, 2009, the entire contents of which are incorporated herein by reference.

FIELD

The embodiments discussed therein are directed to a technique for updating configuration information in a storage system including a storage apparatus and a plurality of information processing apparatuses.

BACKGROUND

FIGS. 20 and 21 are diagrams illustrating examples of connection topologies of a storage system.

As depicted in FIG. 20, this storage system is configured to include a RAID (redundant arrays of inexpensive disks) apparatus 501 and a server 601, for example, wherein the server 601 reads and writes data from and to a logical volume provided by the RAID apparatus 501.

The storage system depicted in FIG. 20 is configured by connecting a single server 601 to the single RAID apparatus 501. The server 601 also includes a virtual disk service hardware provider (VDS hardware provider, also known as "VDSHP"), and, using the functions of the VDSHP, the server 601 makes configuration settings for the RAID apparatus 501 and rewrites the configuration information 502 in the RAID apparatus 501.

The VDSHP is a program for supporting Microsoft® Virtual Disk Service (VDS). The VDSHP defines an application program interface in place of a VDS, thereby providing a unified interface for managing disks and RAID volumes. Note that the VDS is a storage-related interface provided by Microsoft for the Windows Server 2003™ platform.

The VDSHP allows various configuration settings, such as allocation of logical unit numbers (LUNs) and affinity settings, for the RAID apparatus 501, by means of the storage management software supported by Windows Server 2003 R2 or the like.

Assuming an example where such VDSHPs are constructed, as depicted in FIG. 21, by connecting a plurality of servers (three in the example depicted in FIG. 21) 601-1, 601-2, and 601-3 to a single RAID apparatus 501.

Note that the reference symbols 601-1 to 601-3 are used hereinafter for referring to a specific server while reference symbol 601 is used when reference is made to any of the multiple servers.

In the topology wherein the plurality of servers 601 are connected to the RAID apparatus 501, the integrity of the configuration may be compromised when the VDSHPs in the servers 601 make a configuration setting for the RAID apparatus 501 simultaneously.

One known technique for assuring the integrity of the configuration is to use a management server, wherein the management server manages all modifications made by the servers 601 to the configuration information in a centralized manner by using a configuration information database (see Japanese Laid-Open Patent Publication No. 2003-108420, for example).

This technique requires, however, a configuration information database or a management server, and accordingly, may increase the system installation and operation costs.

As an alternative, another technique has been come up with, wherein, prior to making a configuration setting for the RAID apparatus 501 in the respective servers 601, configuration information 603 stored in the VDSHP is updated (refreshed) using configuration information 502 stored in the RAID apparatus 501.

FIG. 22 is a diagram illustrating a technique for refreshing configuration information in a conventional storage system.

For example, assuming that the server 601-2 wants to make a configuration setting for the RAID apparatus 501, the server 601-2 looks up the configuration information 502 in the RAID apparatus 501, before actually performing a configuration setting operation for the RAID apparatus 501.

The server 601-2 then obtains all pieces of configuration information 502 from the RAID apparatus 501, as depicted in FIG. 22, and overwrites configuration information 603-2 with the obtained can keep its configuration information 603-2 updated. The server 601-2 then modifies and sets both the configuration information 502 in the RAID apparatus 501 and the configuration information 603-2 in the server 601-2.

However, such refreshing processing for updating the configuration information 603 in the server 601 using all pieces of the configuration information 502 stored in the RAID apparatus 501 takes some time, for example, about two minutes. Experiencing such waiting time every time a user makes a configuration setting for the server 601 may impair the efficiency of processing, as well as being bothering.

SUMMARY

Accordingly, the first aspect of the present embodiments is a processing method in a storage system including a storage apparatus that stores data and executes processing on the data on the basis of first configuration information stored in a first configuration information storage section, and a plurality of information processing apparatuses that are connected to the storage apparatus via a first communication link, each information processing apparatus including a second configuration information storage section that stores second configuration information being a duplicate of the first configuration information, and each information processing apparatus being capable of modifying the first configuration information, the method including: modifying, by a first information processing apparatus of the plurality of information processing apparatuses, the first configuration information in the storage apparatus; notifying, by the first information processing apparatus, a second information processing apparatus of the plurality of information processing apparatuses in the storage system, of modified part information indicating a modified part in the first configuration information modified during the modifying, the second information processing apparatus being different from the first information processing apparatus and being connected to via a second communication link different from the first communication link; in response to being notified with the modified part information, storing, by the second information processing apparatus, the modified part information in a modified part information storage section; and prior to modifying the first configuration information in the storage apparatus, updating, by the second information processing apparatus, the modified part in the second configuration information indicated by the modified part information stored in the modified part information storage section, on the basis of the first configuration information.

In addition, the second aspect of the present embodiments is a storage system including: a storage apparatus that stores data and executes processing on the data on the basis of first configuration information stored in a first configuration information storage section; and a plurality of information processing apparatuses connected to the storage apparatus via a first communication link, a first information processing apparatus of the plurality of information processing apparatuses including: a second configuration information storage section adapted to store second configuration information being a duplicate of the first configuration information; a first configuration information modification section adapted to modify first configuration information in the storage apparatus; a notification section adapted to notify, a second information processing apparatus of the plurality of information processing apparatuses in the storage system, of modified part information indicating a modified part in the first configuration information modified by the first configuration information modification section, the second information processing apparatus being connected to via a second communication link different from the first communication link and being different from the first information processing apparatus; a modified part information storage section adapted to store the modified part information notified by the second information processing apparatus; and an updating section adapted to update, prior to modifying the first configuration information in the storage apparatus, the modified part in the second configuration information indicated by the modified part information stored in the modified part information storage section, on the basis of the first configuration information.

Furthermore, the third aspect of the present embodiments is an information processing apparatus connected, via a first communication link, to a storage apparatus that executes processing on data on the basis of first configuration information stored in a first configuration information storage section, the information processing apparatus including: a second configuration information storage section adapted to store second configuration information being a duplicate of the first configuration information; a first configuration information modification section adapted to modify first configuration information in the storage apparatus; a notification section adapted to notify a second information processing apparatus connected via a second communication link of modified part information indicating a modified part in the first configuration information modified by the first configuration information modification section; a modified part information storage section adapted to store the modified part information notified by the second information processing apparatus; and an updating section adapted to update, prior to modifying the first configuration information in the storage apparatus, the modified part in the second configuration information indicated by the modified part information stored in the modified part information storage section, on the basis of the first configuration information.

The forth aspect of the present embodiments is a computer-readable storage medium storing a program, the program makes a computer that is connected, via a first communication link, to a storage apparatus that executes processing on data on the basis of first configuration information stored in a first configuration information storage section, when executed, the program making the computer to function as: a second configuration information storage section adapted to store second configuration information being a duplicate of the first configuration information; a first configuration information modification section adapted to modify first configuration information in the storage apparatus; a notification section adapted to notify a second information processing apparatus connected via a second communication link of modified part information indicating a modified part in the first configuration information modified by the first configuration information modification section; a modified part information storage section adapted to store the modified part information notified by the second information processing apparatus; and an updating section adapted to update, prior to modifying the first configuration information in the storage apparatus, the modified part in the second configuration information indicated by the modified part information stored in the modified part information storage section, on the basis of the first configuration information.

The object and advantages of the invention will be realized and attained by means of the elements and combinations particularly pointed out in the claims.

It is to be understood that both the foregoing general description and the following detailed descriptions are exemplary and explanatory and are not restrictive of the invention, as claimed.

DESCRIPTION OF EMBODIMENT(S)

Hereinafter, embodiments of the present invention will be described with reference drawings.

Figure 1:
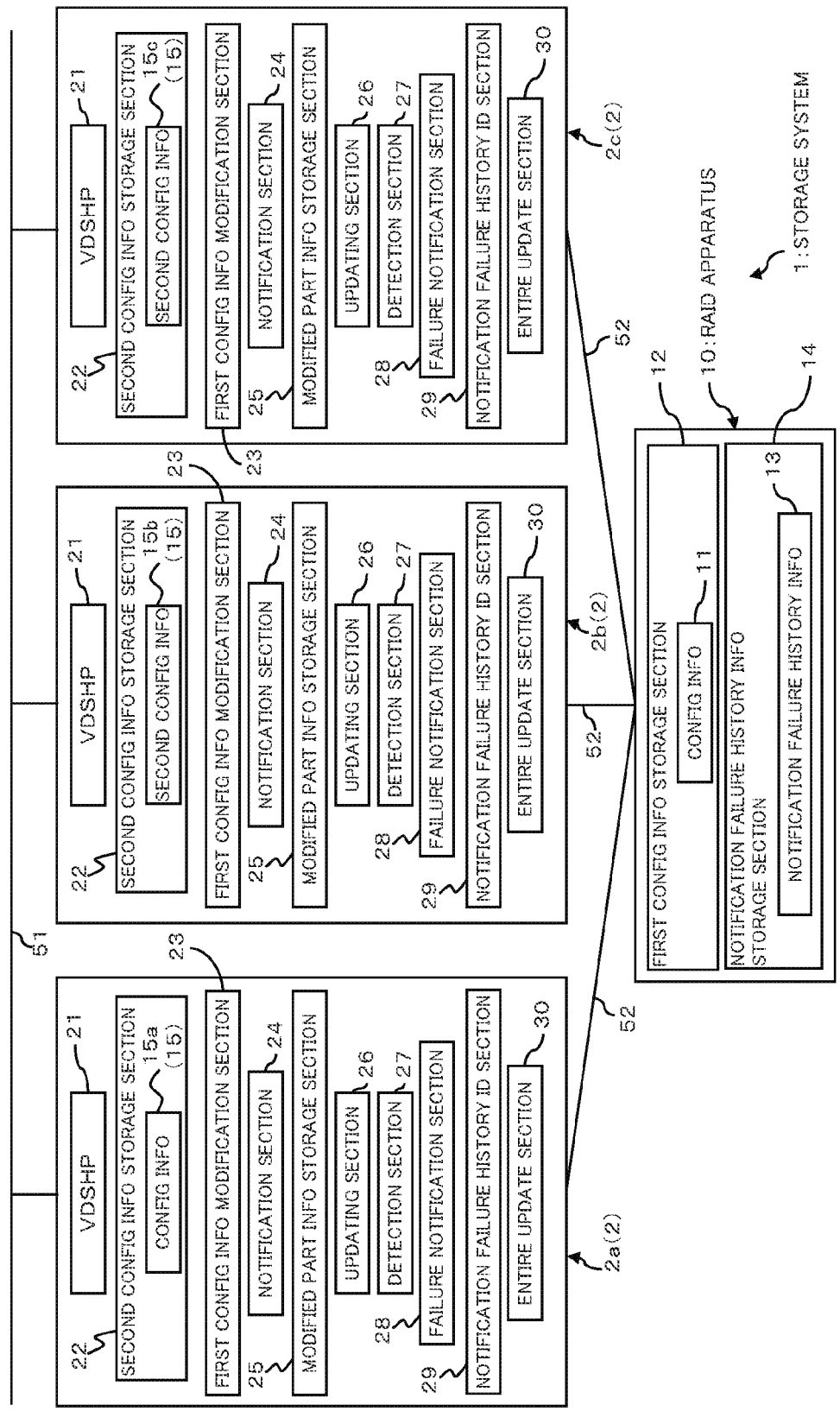
FIG. 1 is a diagram schematically illustrating an example of a functional configuration of a storage system as one example of an embodiment.
Figure 2:
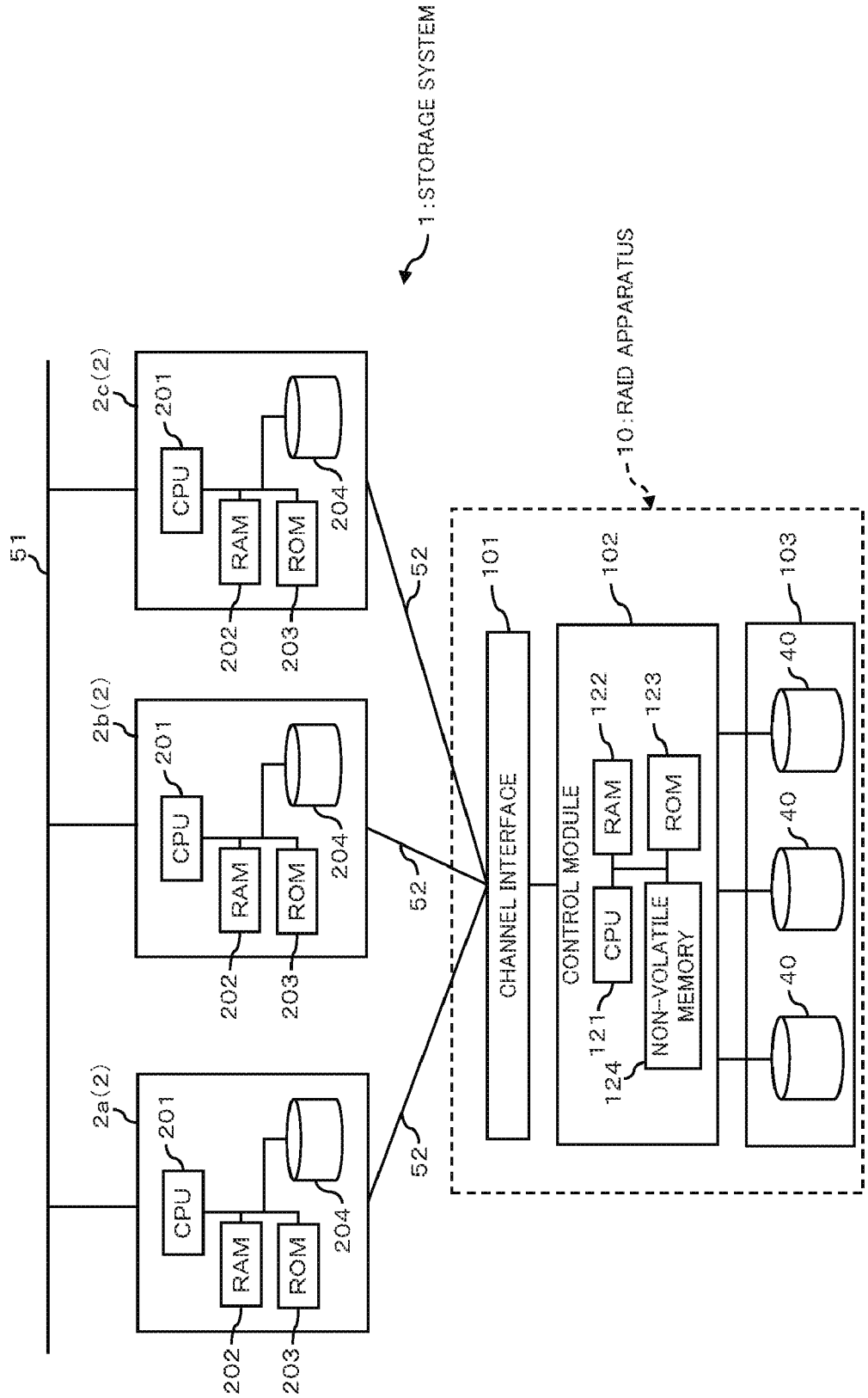
FIG. 2 is a diagram schematically illustrating an example of a hardware configuration of a storage system as one example of an embodiment.

FIG. 1 is a diagram schematically illustrating an example of a functional configuration of a storage system as one example of an embodiment, and FIG. 2 is a diagram schematically illustrating an example of a hardware configuration thereof.

As depicted in FIGS. 1 and 2, the storage system 1 of this embodiment is configured by communicatively connecting a plurality of (three in this embodiment) server computers (hereinafter simply referred to as "servers") 2a, 2b, and 2c to a RAID (redundant arrays of inexpensive disks) apparatus 10. Note that the reference symbol 2a, 2b, or 2c is used hereinafter for referring to a specific server while reference symbol 2 is used when reference is made to any of the multiple servers.

The RAID apparatus (storage apparatus) 10 is managed as a single redundant storage constructed by a plurality of hard disk drives (HDDs) 40, providing the servers 2 with a virtual storage. As depicted in FIG. 2, the RAID apparatus 10 is configured to include a channel interface 101, a control module 102, and a drive enclosure 103.

The channel interface 101 is an interface for communicatively connecting among the RAID apparatus 10 and the servers 2, and is configured according to the FC (Fibre Channel) standard in this embodiment. Note that the standard used for the channel interface 101 is not limited to the FC, and the channel interface 101 may be embodied in various forms, such as by using the small computer system interface (SCSI), for example.

The drive enclosure 103 is configured to include a plurality of HDDs 40. Each HDD 40 is a storage apparatus including a disk-shaped storage medium having magnetic materials applied thereon and a magnetic head (not illustrated), wherein data is read and written by means of this magnetic head, and is communicatively connected to the control module 102 via an HDD interface that is not illustrated. The respective HDDs 40 may have the similar configuration.

The control module 102 performs various types of computing and controls for the RAID and access controls on the HDDs 40. As depicted in FIG. 2, the control module 102 is configured to include a CPU 121, a RAM 122, a ROM 123, and a non-volatile memory 124.

The ROM 123 stores various kinds of programs and data for implementing functions as the RAID apparatus 10. The CPU 121 is an apparatus performing various types of computing and controls, and implements various functions as the RAID apparatus 10 by executing programs stored in the ROM 123.

The RAM 122 is used to temporary store various kinds of programs and data when the CPU 121 performs computing and controls.

Note that the RAID functions of the RAID apparatus 10 may be implemented using various techniques well-known in the art, and the detailed descriptions thereof will be omitted for brevity.

The non-volatile memory 124 is adapted to maintain information about the RAID apparatus 10, such as settings, and stores configuration information (first configuration information) 11 about the RAID apparatus 10, for example. The configuration information 11 is various types of setting information and status information for implementing the RAID, for example, and may include LUN allocations, affinity settings, volume information, volume count, status, and the like. In other words, in the RAID apparatus 10, the non-volatile memory 124 functions as a first configuration information storage section 12 adapted to store the configuration information 11. Note that configuration information is known information related to RAID apparatus, and detailed descriptions will be omitted.

In the control module 102, the CPU 121 implements various functions as the RAID apparatus 10 (RAID function) by using the configuration information 11 stored in the non-volatile memory 124.

Such RAID functions include provision of RAID levels 1-6, setting and management of exclusive control rights to the plurality of servers 2. The RAID functions also include a function to modify configuration information in response to a configuration information modification command sent from a server 2. Note that, in the storage system 1, the function of the VDSHP 21 in each server 2 makes a configuration setting for the RAID apparatus 10, and the function of the VDSHP 21 reads or writes the configuration information 11 in the RAID apparatus 10. Such RAID functions are well known in the art as functions of RAID apparatuses, and detailed descriptions will be omitted.

The server 2a, 2b, and 2c are information processing apparatuses (computers), and request a write or read (issue a Write or Read request) of data to the logical device provided by the RAID apparatus 10. Note that the server 2a, 2b, and 2c have the configurations similar to each other.

Each server 2 is communicatively connected to the RAID apparatus 10 via respective FC links 52 as a first communication link.

Hereinafter, although this embodiment will be described in the context wherein the server 2a primarily obtains a exclusive control right for editing the configuration information 11 in the RAID apparatus 10 and modifies the configuration information 11 in the RAID apparatus 10, the scenarios wherein the server 2b or 2c modifies the configuration information 11 in the RAID apparatus 10 may be the same as this example.

In addition, thereinafter the servers 2a, 2b, and 2c may be referred to as a server A, a server B, and a server C, respectively.

As depicted in FIG. 2, each server 2 is configured to include a CPU 201, a RAM 202, a ROM 203, and a storage apparatus 204.

The CPU 201 is a control apparatus performing various types of computing and controls, and CPU 201 embodies various functions by executing the operating system (OS) and programs stored in the ROM. 203 or the storage apparatus 204. The ROM 203 is adapted to store various programs and pieces of data, and the RAM 202 is used by the CPU 201 to temporarily store and decompress various kinds of programs and data when performing computing and controls. The storage apparatus 204 is a HDD, for example, that stores various programs and pieces of data, as well as the operating system executed by the CPU 201.

The server 2a, 2b, and 2c are communicatively connected to each other via a communication link 51 as a second communication link. The communication link 51 is compliant with a local area network (LAN) standard, for example. Hereinafter, the communication link 51 may be referred to as the "LAN 51."

The respective CPUs 201 in the servers 2 function as a first configuration information modification section 23, a notification section 24, an updating section 26, a detection section 27, a failure notification section 28, a notification failure history confirmation section 29, and an entire update section 30 that will be described later, by executing a program.

Note that programs (firmware) for implementing the functions as the first configuration information modification section 23, the notification section 24, the updating section 26, the detection section 27, the failure notification section 28, the notification failure history confirmation section 29, and the entire update section 30 are provided in the form of programs recorded on a computer readable recording medium, such as, for example, a flexible disk, a CD (e.g., CD-ROM, CD-R, CD-RW), a DVD (e.g., DVD-ROM, DVD-RAM, DVD-R, DVD+R, DVD-RW, DVD+RW, HD DVD), a Blu Ray disk, a magnetic disk, an optical disk, a magneto-optical disk, or the like. The computer then reads a program from that storage medium and uses that program after transferring it to the internal storage apparatus or external storage apparatus or the like. Alternatively, the program may be recoded on a storage device (storage medium), for example, a magnetic disk, an optical disk, a magneto-optical disk, or the like, and the program may be provided from to the storage device to the computer through a communication path.

Upon embodying the functions as the first configuration information modification section 23, the notification section 24, the updating section 26, the detection section 27, the failure notification section 28, the notification failure history confirmation section 29, and the entire update section 30, programs stored in internal storage apparatuses (the RAM 202 and the ROM 203) are executed by a microprocessor of the computer (the CPU 201 in this embodiment). In this case, the computer may alternatively read a program stored in the storage medium for executing it.

Note that, in this embodiment, the term "computer" may be a concept including hardware and an operating system, and may refer to hardware that operates under the control of the operating system. Alternatively, when an application program alone can make the hardware to be operated without requiring an operating system, the hardware itself may represent a computer. The hardware includes at least a microprocessor, e.g., CPU, and a means for reading a computer program recorded on a storage medium and, in this embodiment, the servers 2 include a function as a computer.

In addition, a program for embodying a VDS hardware provider (VDSHP) 21 is stored in the storage apparatus 204 of a server 2, and thus the function as the VDSHP 21 is provided in the server 2 by the CPU 201 executing this program. In other words, Microsoft Virtual Disk Service (VDS) is supported.

The server 2 can create volumes or establish a host affinity in the RAID apparatus 10 through its own VDSHP 21. In addition, the server 2 edits configuration settings and the configuration information 11 in the RAID apparatus 10 by way of the VDSHP 21. Note that the function as the VDSHP 21 is well-known and detailed descriptions will be omitted.

More specifically, in a server 2, the CPU 201 (the VDSHP 21) functions as the first configuration information modification section 23 (see FIG. 1) that modifies (sets) the configuration information 11 in the RAID apparatus 10. Note that, hereinafter, modification (setting) of the configuration information 11 in the RAID apparatus 10 by the first configuration information modification section 23 may be referred to as a "configuration setting operation."

In addition, in the server 2a, configuration information (second configuration information, slave configuration information) 15a being a duplicate of configuration information (first configuration information, master configuration information) 11 in the RAID apparatus 10 is stored in the RAM 202 or the storage apparatus 204. Similarly, configuration information 15b is stored in the RAM 202 or the storage apparatus 204 in the server 2b, and configuration information 15c is stored in the RAM 202 or the storage apparatus 204 in the server 2c.

Note that the reference symbol 15a, 15b, or 15c is used hereinafter for referring to specific configuration information as the second configuration information while reference symbol 15 is used when reference is made to any of the configuration information.

More specifically, in the server 2, the RAM 202 and the storage apparatus 204 function as a second configuration information storage section 22 (see FIG. 1) that stores configuration information (second configuration information) 15 being a duplicate of the configuration information 11 in the RAID apparatus 10.

The server 2 (for example, the server 2a) that has a right to access the RAID apparatus 10 (exclusive control right) modifies the configuration information 11 in the RAID apparatus 10 by way of the VDSHP 21, and copies (duplicates) the modified configuration information 11. The server 2 updates the configuration information 15 by overwriting the configuration information 15 stored in the RAM 202 or the like with the copied configuration information 11.

Note that there are two types of update of the configuration information 15, as will be described later, i.e., overwriting update (refresh) by the entire update section 30 using the entire configuration information 11 in the RAID apparatus 20, and another type of overwriting update (refresh) by the updating section 26 using the portion (modified part, configuration setting area) of the configuration information 11 modified by a servers 2.

In addition, in a server 2, the CPU 201 relates a storage area of the configuration information 11 in the second configuration information storage section 22 to a storage area of the configuration information 11 in the non-volatile memory 124 in the RAID apparatus 10. This relation can be defined by correlating the addresses of the storage areas, by using a matrix or conversion formula used for address conversion, for example.

This enables the CPU 201 to easily identify corresponding configuration information 11 in the second configuration information storage section 22 for any locations of the configuration information 11 in the non-volatile memory 124 in the RAID apparatus 10.

The notification section 24 notifies all servers 2 connected via the LAN 51 (the servers 2b and 2c, for example) of notification information (modified part information) N1 representing the part of the configuration information 11 modified by the first configuration information modification section 23.

Figure 3:
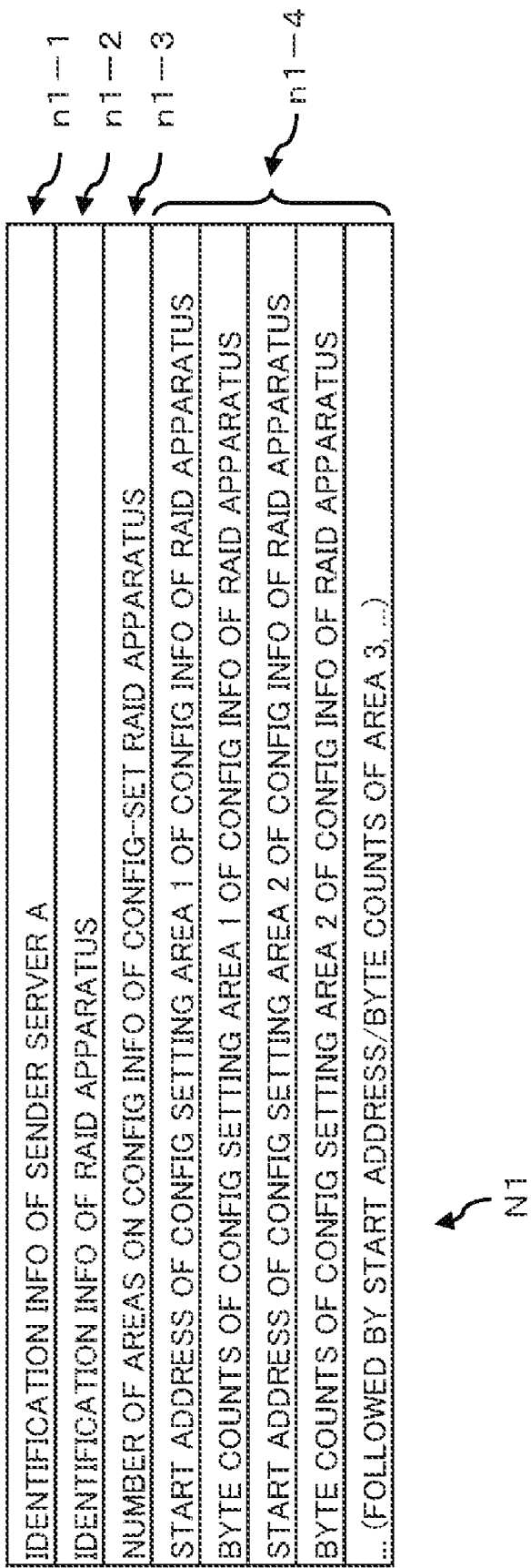
FIG. 3 is a diagram illustrating an example of notification information in a storage system as one example of an embodiment.

FIG. 3 is a diagram illustrating an example of the notification information N1 in the storage system 1. The notification information N1 is adapted to indicate that configuration setting is made, and is configured to include identification information n1-1 of a sender server, identification information n1-2 of the RAID apparatus 10, the count of modified configuration part(s) n1-3 and one or more configuration modified parts n1-4.

The identification information n1-1 of the sender server is information identifying the server 2 that sends the notification information N1, and the network IP address of that server 2 is used in the example depicted in FIG. 3. The identification information n1-2 of the RAID apparatus 10 is information for identifying the RAID apparatus 10, and the IP address of the RAID apparatus 10 is used in the example depicted in FIG. 3. The count of modified configuration part(s) n1-3 is the count of one or more areas which undergo configuration setting (configuration modification) in the configuration information 11 in the RAID apparatus 10 (hereinafter, such areas may be referred to as "configuration setting areas").

The one or more configuration modified parts n1-4 are information indicating the locations of one or more configuration setting areas, and start addresses of the configuration setting areas and their byte counts are used in the example depicted in FIG. 3. Note that the one or more configuration modified parts n1-4 are not limited to the start addresses of the configuration setting areas and their byte counts as described above, and various modifications may be possible, such as using the start and end addresses of a configuration setting area, for example.

Note that the notification information N1 includes other types of control information required for data communication through the LAN 51, such as the destination address, in addition to the information described above, and their description will be omitted for brevity.

Figure 4:
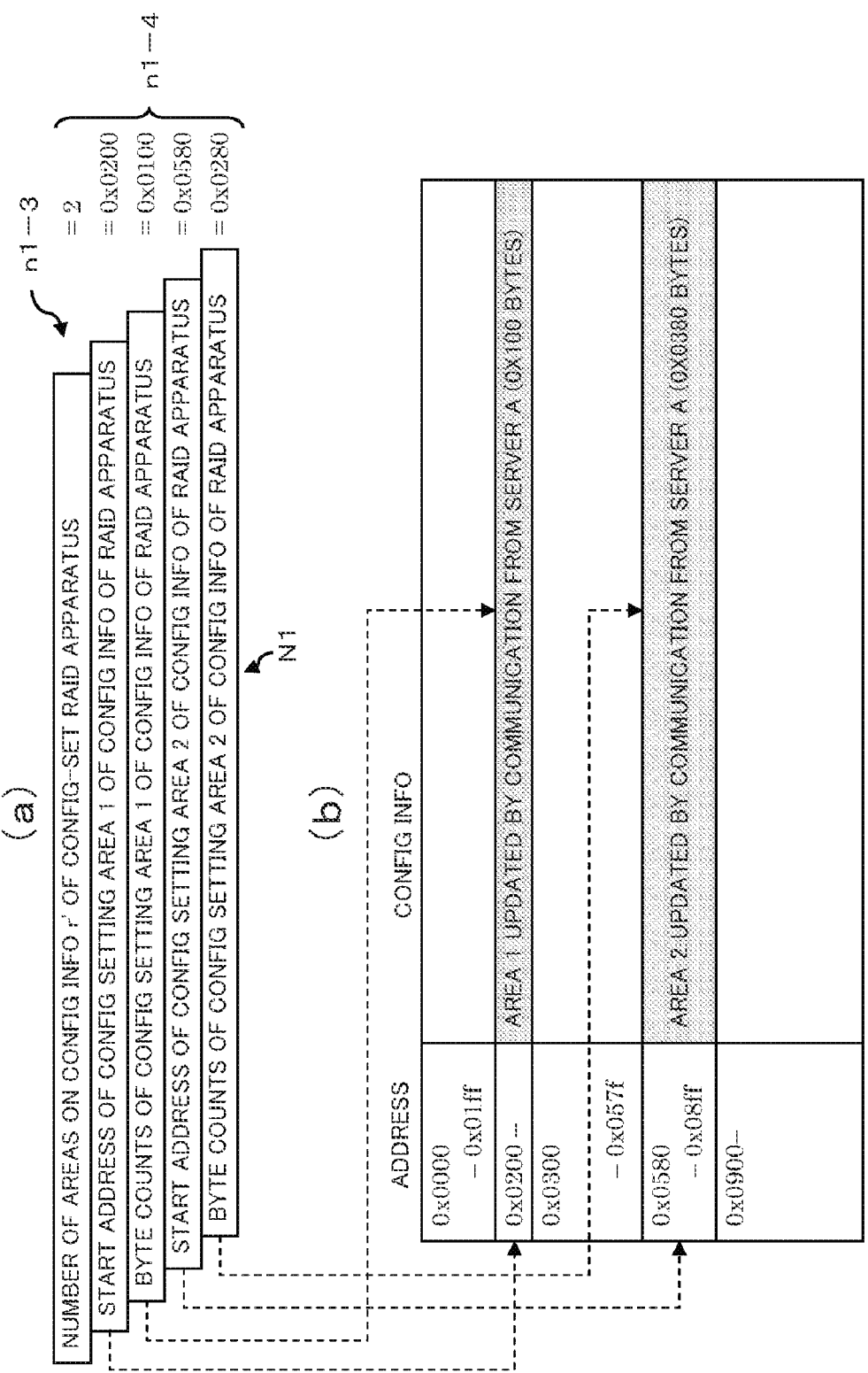
FIG. 4 is a diagram illustrating a relation between configuration information of an RAID apparatus and notification information in a storage system as one example of an embodiment.

FIG. 4 is a diagram illustrating a relation between configuration information of the RAID apparatus 10 and notification information in the storage system 1 wherein Part (a) depicts notification information and Part (b) depicts configuration information 11.

The example depicted in FIG. 4 illustrates an example wherein the first configuration information modification section 23 performs configuration modification, wherein the configuration information 11 in the RAID apparatus 10 stored in the non-volatile memory 124 is modified in two areas, namely, a 0x100-byte area having addresses of 0x0200 to 0x0300 (configuration setting area 1) and a 0x0380-byte area having addresses of 0x0580 to 0x08ff (configuration setting area 2).

For the configuration modification of the two parts depicted in FIG. 4B, the notification section 24 obtains information as depicted in FIG. 4A, and generates notification information N1 accordingly. More specifically, the notification section 24 sets "2" to the count of modified configuration parts n1-3. In addition, the notification section 24 sets the start address "0x200" of the configuration setting area 1, the byte count "0x0100" of the configuration setting area 1, the start address "0x0580" of the configuration setting area 2 and the byte count "0x0380" of the configuration setting area 2 to configuration modified parts n1-4.

The notification section 24 then sends, via the LAN 51, the notification information N1 generated in the manner as described above to all of the other servers 2 in the same storage system 1 sharing the RAID apparatus 10. The technique for sending the notification information N1 can be embodied in accordance with various techniques compliant with the communication protocol of the LAN 51.

In response to receiving the notification information N1 from the server 2a, the remaining servers 2b and 2c store the received notification information N1 to a certain area in the RAM 202 or the storage apparatus 204 (modified part information storage section 25; see FIG. 1), for example. Similarly, when receiving the notification information N1 from the server 2b or 2c, the server 2a stores the received notification information N1 in the modified part information storage section 25.

The detection section 27 detects failure of notification of notification information N1 by the notification section 24 to another server 2 (for example, the server 2b). The detection section 27 detects the failure of the notification of the notification information N1 by detecting that a session cannot be established with another server 2 (the server 2b) or that an expected response has not been received by that server 2. A failure of notification to another server 2 may occur when a network disconnection occurs in the LAN 51, resulting in failed communication.

The failure notification section 28, in response to detecting the failure of notification of the modified part information to another server 2 (the server 2b), notifies the RAID apparatus 10 and the other server 2 (the server 2c), to which notification of the modified part information has been succeeded, of an indication that the notification of the modified part information to another server 2b has failed.

The indication that the notification of the modified part information to another server 2b has failed includes at least information identifying the sender of the notification information N1 (for example, server A) and information identifying the destination to which the notification information N1 cannot be reached (for example, the server 2b). The indication that the notification information N1 has failed is stored as notification failure history information 13 in a certain region of the non-volatile memory 124 in the RAID apparatus 10.

In other words, in the RAID apparatus 10, the non-volatile memory 124 functions as a notification failure history information storage section that stores, when a failure of the notification of the notification information N1 to another server 2b is notified by the failure notification section 28, information related to the server 2b, which is the destination of the modified part information, as the notification failure history information 13 (see FIG. 1). Note that the information related to the server 2b, which is the destination of the modified part information, may be identification information that can be used to identify the server 2 of the destination of the notification, and the network IP address of that serves 2 may be used, for example.

In addition, in the other server 2c, the indication of the failure of notification of the modified part information is stored as notification failure history information 13 in a certain region in the RAM 202 or the storage apparatus 204, for example.

Prior to updating the configuration information 11 in the RAID apparatus 10, the updating section 26 updates the modified part in configuration information 15 stored in the second configuration information storage section 22 in that server (local server) 2, the modified part being indicated by the notification information N1 stored in the modified part information storage section 25 in that server 2, on the basis of the configuration information 11 in the RAID apparatus 10.

The updating section 26 obtains an exclusive control right that permits the local server 2 to modify the configuration information 11 in the RAID apparatus 10, and updates the configuration information 15 immediately before modifying the configuration information 11 in the RAID apparatus 10.

More specifically, the updating section 26 obtains an exclusive control right that permit the local server 2 to modify the configuration information 11 in the RAID apparatus 10, and extracts setting modified parts n1-4 from the notification information N1 stored in the modified part information storage section 25 for modifying the configuration information 11 in the RAID apparatus 10. In other words, the updating section 26 extracts the start address and the byte count of each configuration setting area from the notification information N1.

The updating section 26 then accesses the configuration information 11 in the RAID apparatus 10, and obtains (copies) data in the areas (modified parts) indicated by the setting modified parts n1-4. The updating section 26 then performs overwriting update on the areas corresponding to the modified parts indicated by the setting modified parts in n1-4 in the configuration information 15 stored in the second configuration information storage section 22 in the local server 2 using the copied data.

The notification failure history confirmation section 29 checks whether or not notification failure history information 13 related to the local server 2 is stored in the notification failure history information storage section 14 in the RAID apparatus 10 prior to modifying the first configuration information 11 in the RAID apparatus 10. More specifically, when the server 2a modifies the configuration information 11 in the RAID apparatus 10, the notification failure history confirmation section 29 in the server 2a checks whether or not notification failure history information 13 related to the server 2a is stored in the notification failure history information storage section 14 prior to any modification. Similarly, when the server 2b or 2c modifies the configuration information 11 in the RAID apparatus 10, the notification failure history confirmation section 29 in the server 2b or 2c checks whether or not notification failure history information 13 related to the server 2b or 2c is stored in the notification failure history information storage section 14 prior to any modification.

When the notification failure history confirmation section 29 determines that notification failure history information related to the local server 2 has been stored in the notification failure history information storage section 14, the entire update section 30 updates the entire configuration information 15 stored in the second configuration information storage section 22 in the local server 2 using the entire first configuration information 11 in the RAID apparatus 10 (complete refresh). More specifically, in the server 2a, when the notification failure history confirmation section 29 determines that notification failure history information related to the server 2a has been stored in the notification failure history information storage section 14, the entire configuration information 15a stored in the second configuration information storage section 22 in the server 2a is updated using the entire first configuration information 11 in the RAID apparatus 10. Similarly, in the server 2b or 2c, when the notification failure history confirmation section 29 determines that notification failure history information related to the server 2b or 2c has been stored in the notification failure history information storage section 14, the entire configuration information 15b or 15c stored in the second configuration information storage section 22 in the local server 2b or 2c is updated using the first configuration information 11 in the RAID apparatus 10.

The processing in the storage system 1 configured as set forth above will be described with reference to FIGS. 5-10. Note that in the example depicted in FIGS. 5-10, the respective servers 2 are capable of communicating with each other through the LAN 51.

Figure 5:
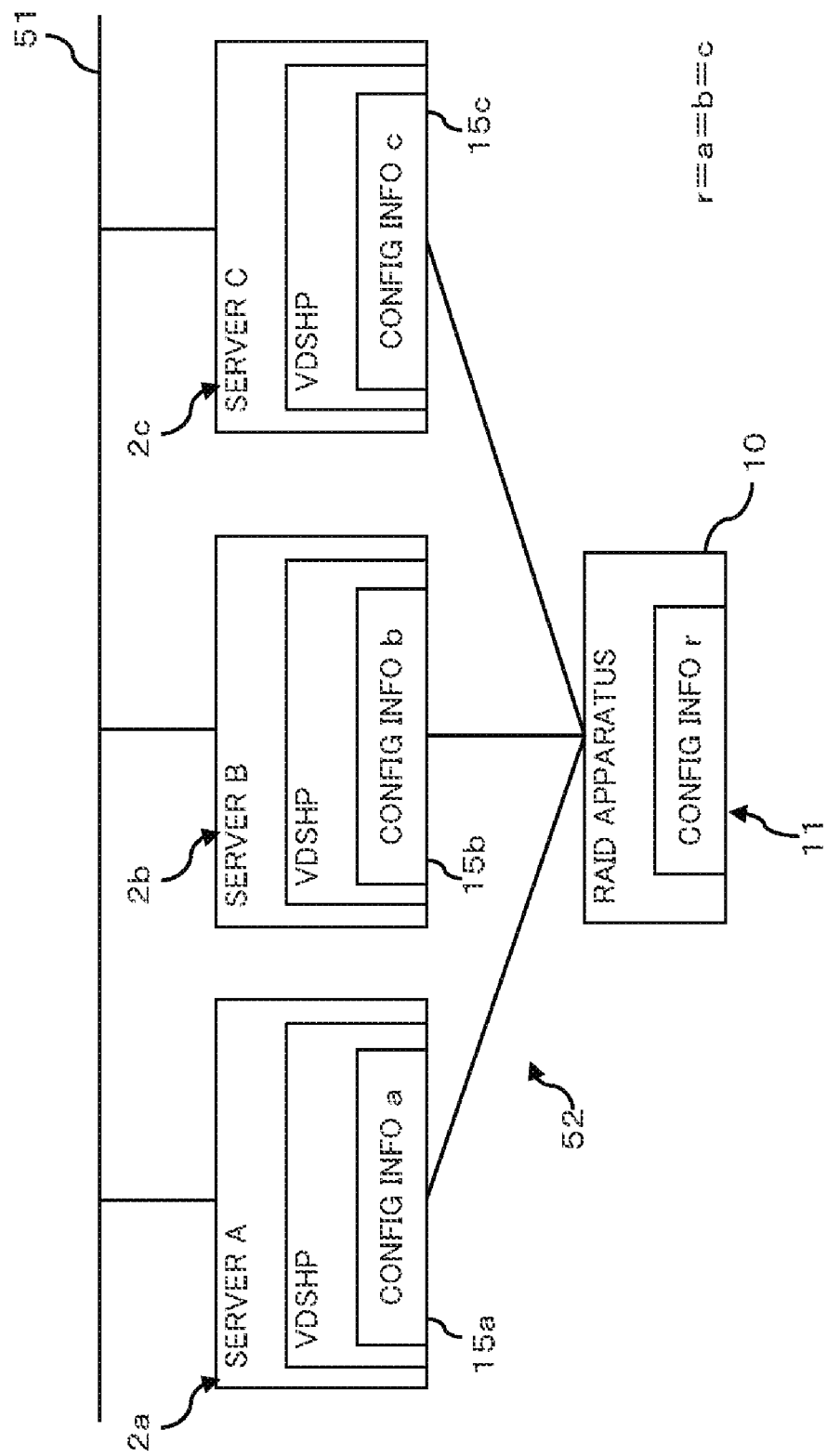
FIGS. 5-10 are diagrams illustrating processing in a storage system as one example of an embodiment.

In the initial state of the storage system 1, i.e., upon launching the VDSHP, as depicted in FIG. 5, communication is carried out between the respective servers 2 and the RAID apparatus 10 to refresh the entire configuration information.

Here, assuming that the configuration information 15a in the server A is a, the configuration information 15b in the server B is b, the configuration information 15c in the server C is c, and the configuration information 11 in the RAID apparatus 10 is r, after the completion of the refresh, the following relationship holds:

$r=a=b=c$

Figure 6:
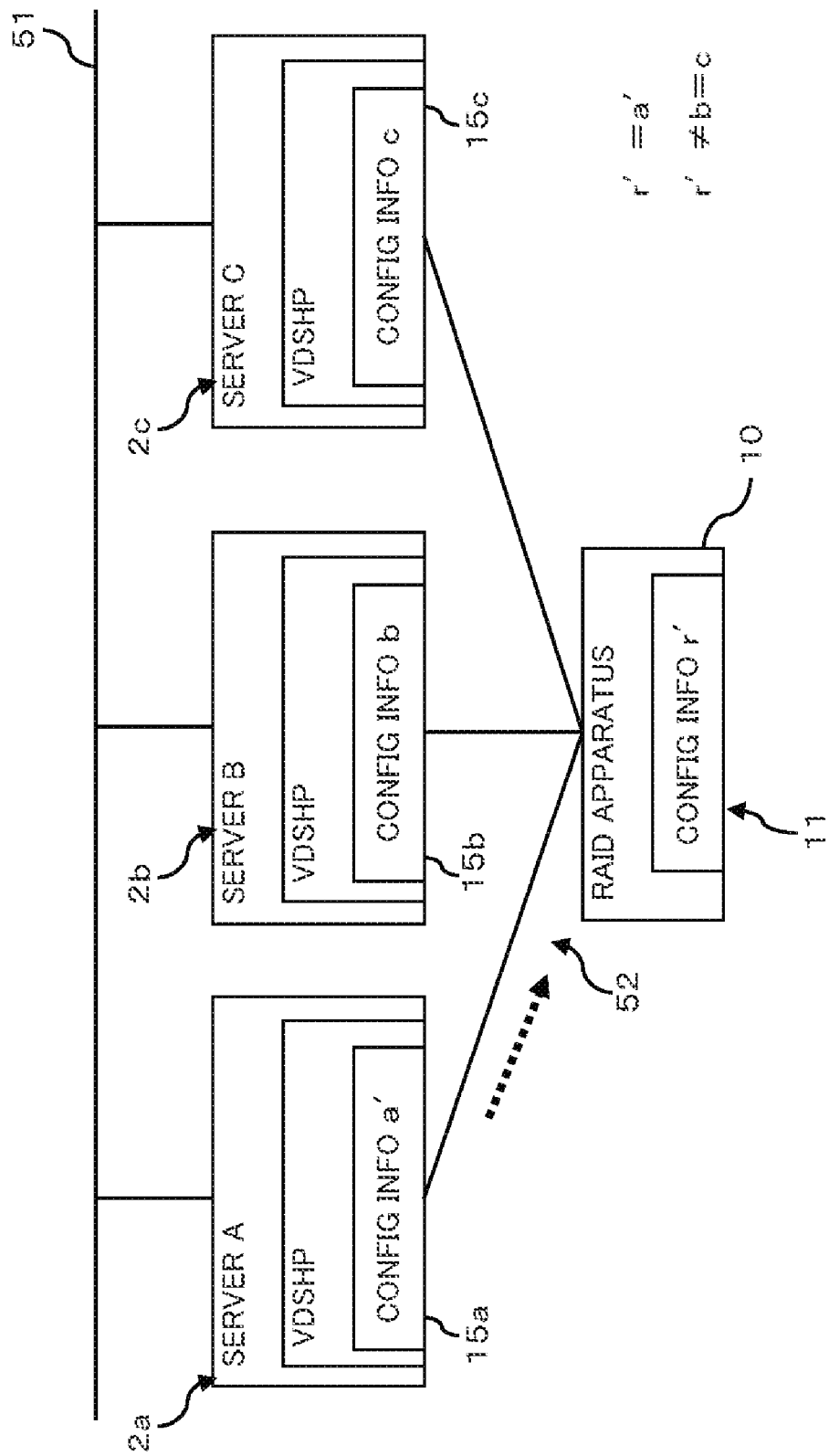

When the server A performs a configuration setting operation on the RAID apparatus 10, as depicted in FIG. 6, in a communication between the server A and the RAID apparatus 10 through the FC link 52, the first configuration information modification section 23 modifies the configuration information 11 in the RAID apparatus 10 to r' and the configuration information 15a in the server A is modified to a'. In other words, the following relationships hold:

$r'=a'$ $r'\neq b=c$

Figure 7:
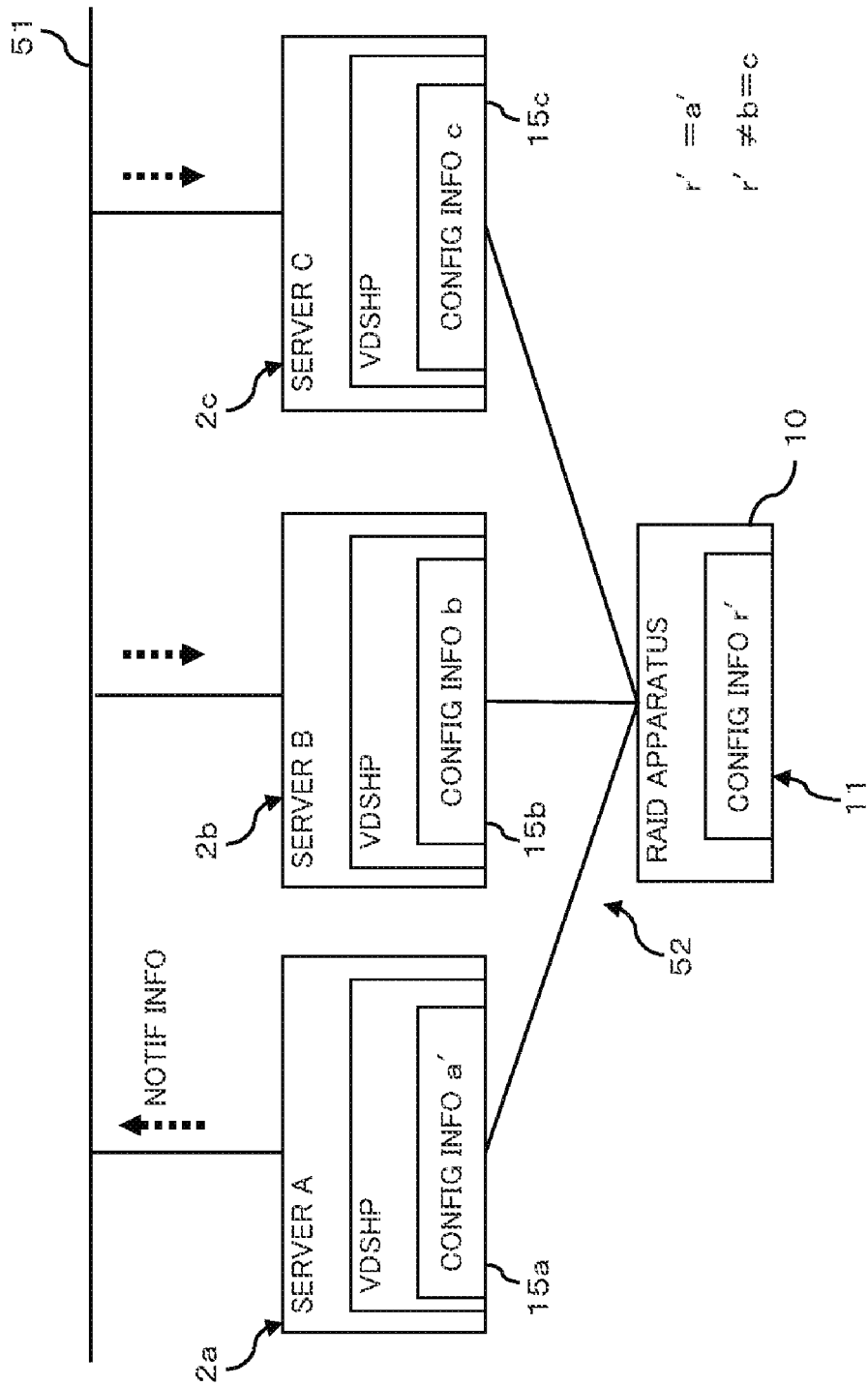

Thereafter, the notification section 24 notifies the other servers B and C of notification information N1 in inter-server communications through the LAN 51, as depicted in FIG. 7. More specifically, the server A sends, as notification information N1, an indication of parts which undergo the configuration setting (modified part information) to the servers B and C within the communication data. The respective VDSHPs in the servers B and C store the received modified part information in the respective modified part information storage section 25.

Figure 8:
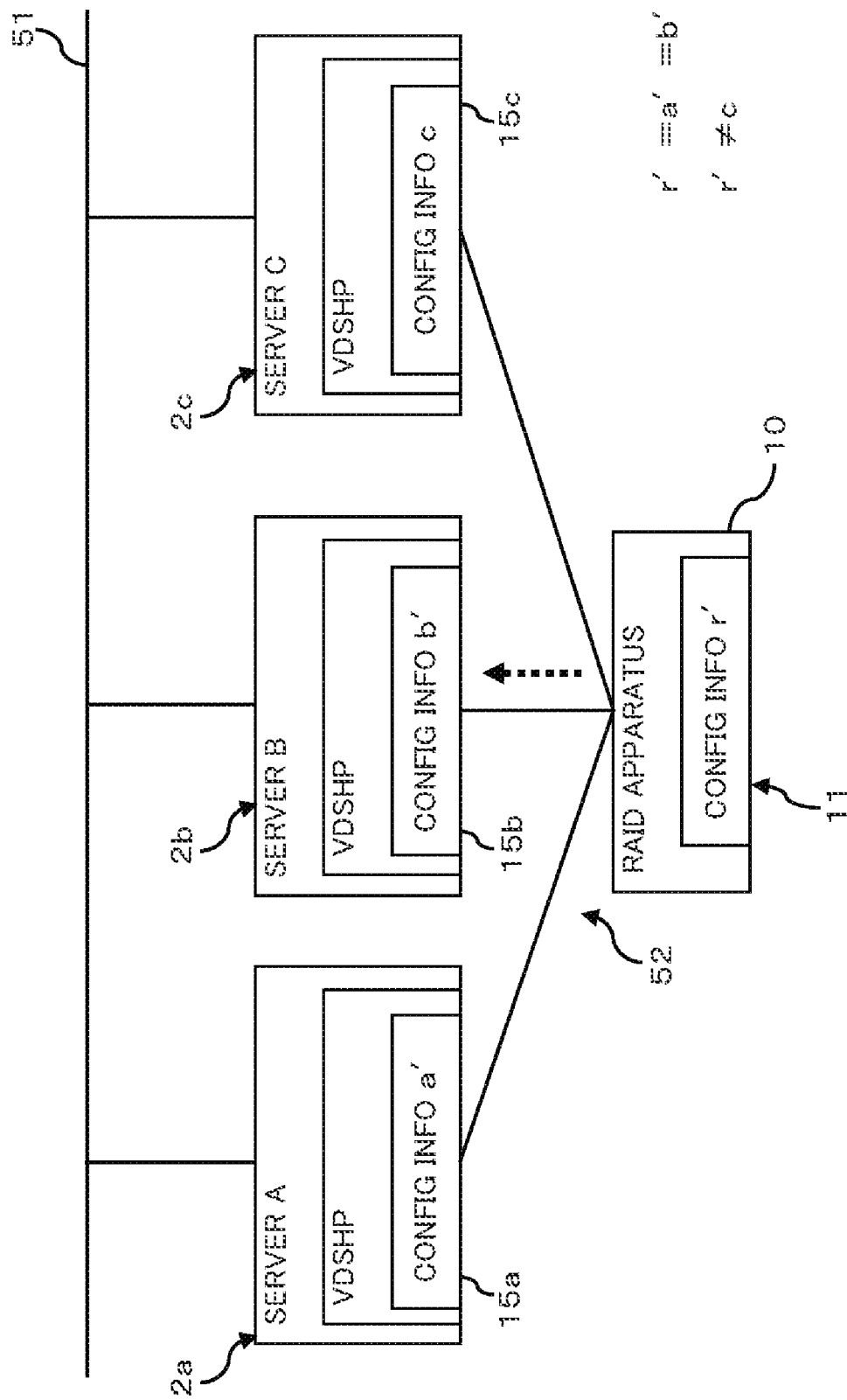

Thereafter, as depicted in FIG. 8, when the server B performs a configuration setting operation, the VDSHP in the server B performs a refresh prior to the configuration setting operation since it is notified by the server A. Here, the refresh is performed only on the areas in the configuration information 15b specified by the modified part information stored in the modified part information storage section 25. This helps to complete the refresh in shorter time as compared to refresh of the entire configuration information 15b. In other words, the refresh can be performed quickly (fast refresh).

Figure 9:
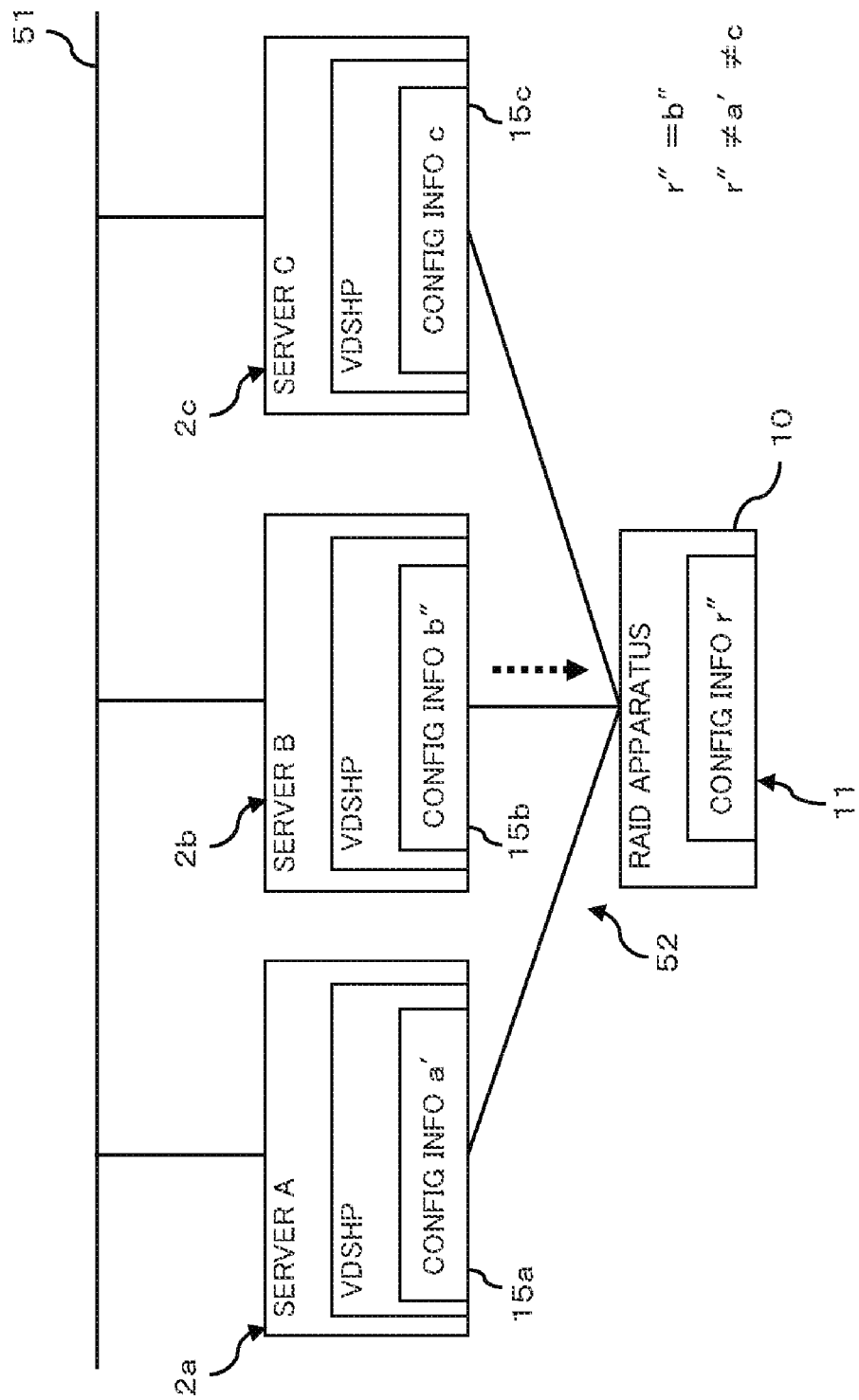

Thereafter, as depicted in FIG. 9, the first configuration information modification section 23 of the server B modifies the configuration information 11 in the RAID apparatus 10 to r'' in a communication between the server and the RAID apparatus 10 through the FC link 52, and the configuration information 15b in the server B is modified from b' to b''. In other words, the following relationships hold:

$r''=b''$ $r''\neq a'\neq c$

Figure 10:
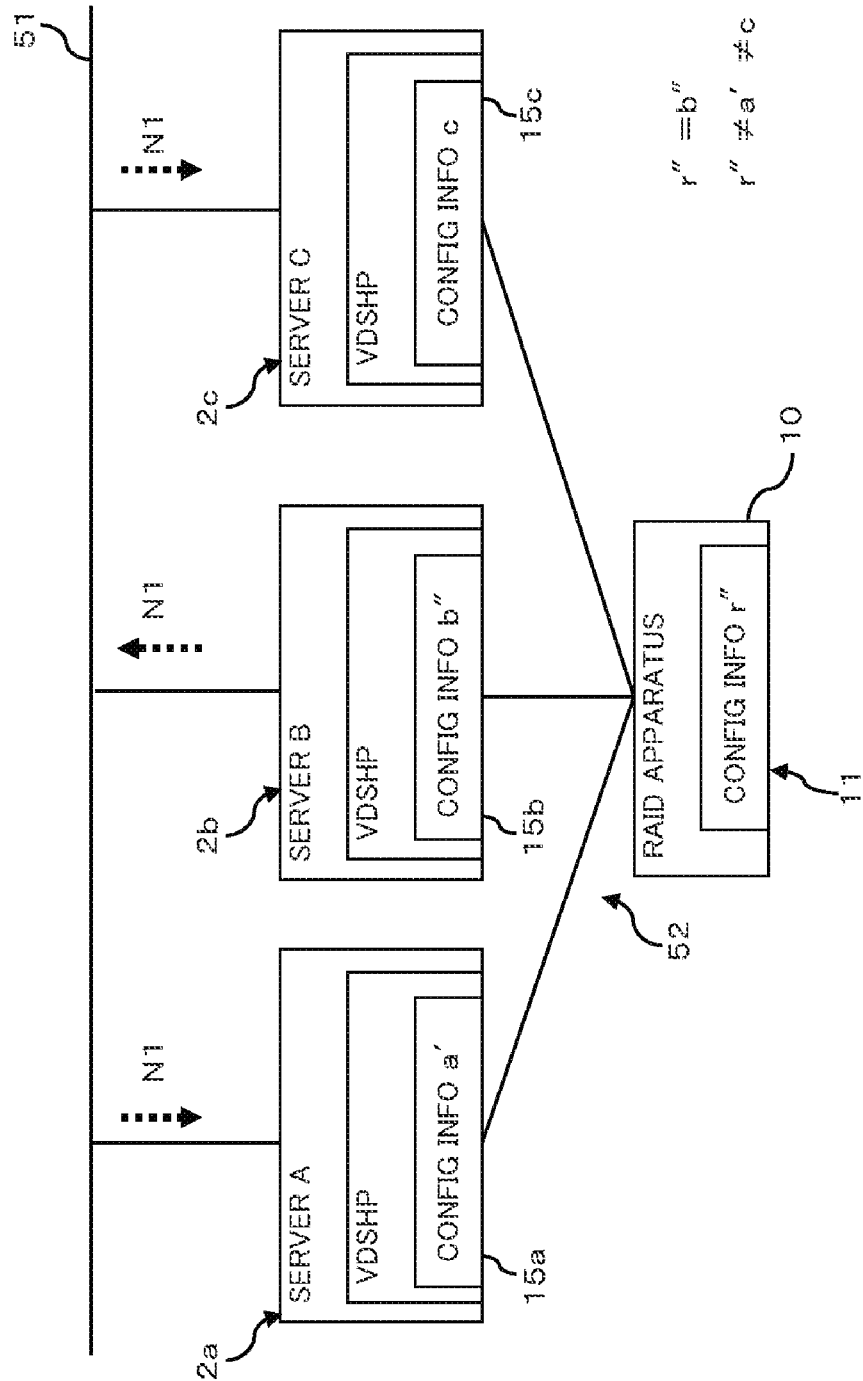

Thereafter, the notification section 24 of the server B notifies the other servers A and C of notification information N1 in inter-server communications through the LAN 51, as depicted in FIG. 10. More specifically, the server B sends, as notification information N1, an indication of parts which undergo the configuration setting (modified part information) to the servers A and C within the communication data. The respective VDSHPs in the servers A and C store the received modified part information in the respective modified part information storage section 25.

Thereafter, every time a configuration setting is performed on the RAID apparatus 10 by a server 2, that server 2 notifies the other servers 2 of notification information N1.

In the example illustrated using FIGS. 5-10, the server C receives modified part information twice. When the server C performs a configuration setting operation on the RAID apparatus 10, the server C performs a refresh on the two parts in the configuration information 15c on the basis of two pieces of modified part information stored in the modified part information storage section 25 in the server C.

The following control may be carried out depending on the status of the transmission routes in the storage system 1 and the timing of a configuration setting operation by a server 2.

Figure 11:
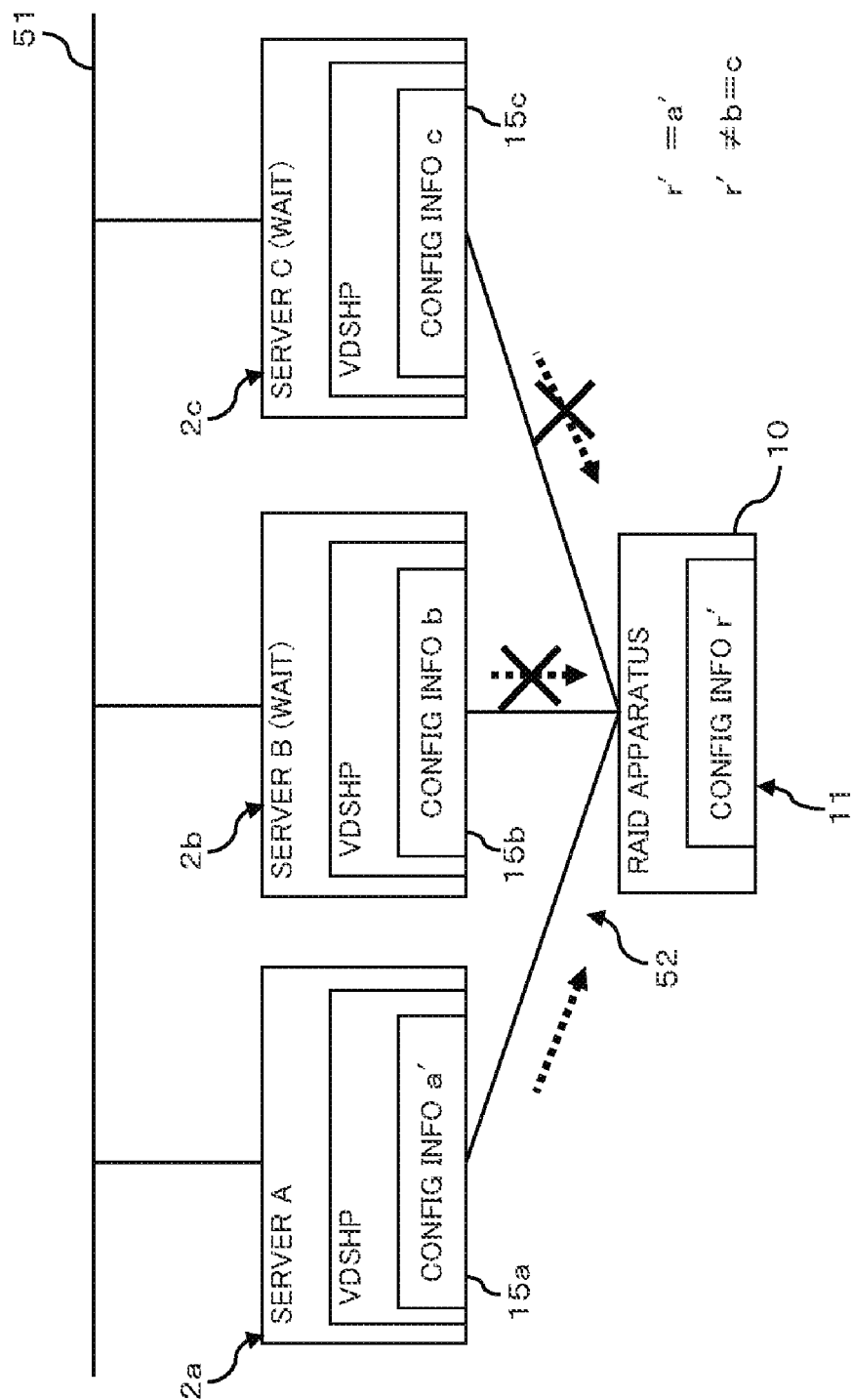
FIGS. 11-13 are diagrams illustrating configuration setting operation processing by a plurality of servers in a storage system as one example of an embodiment.
Figure 12:
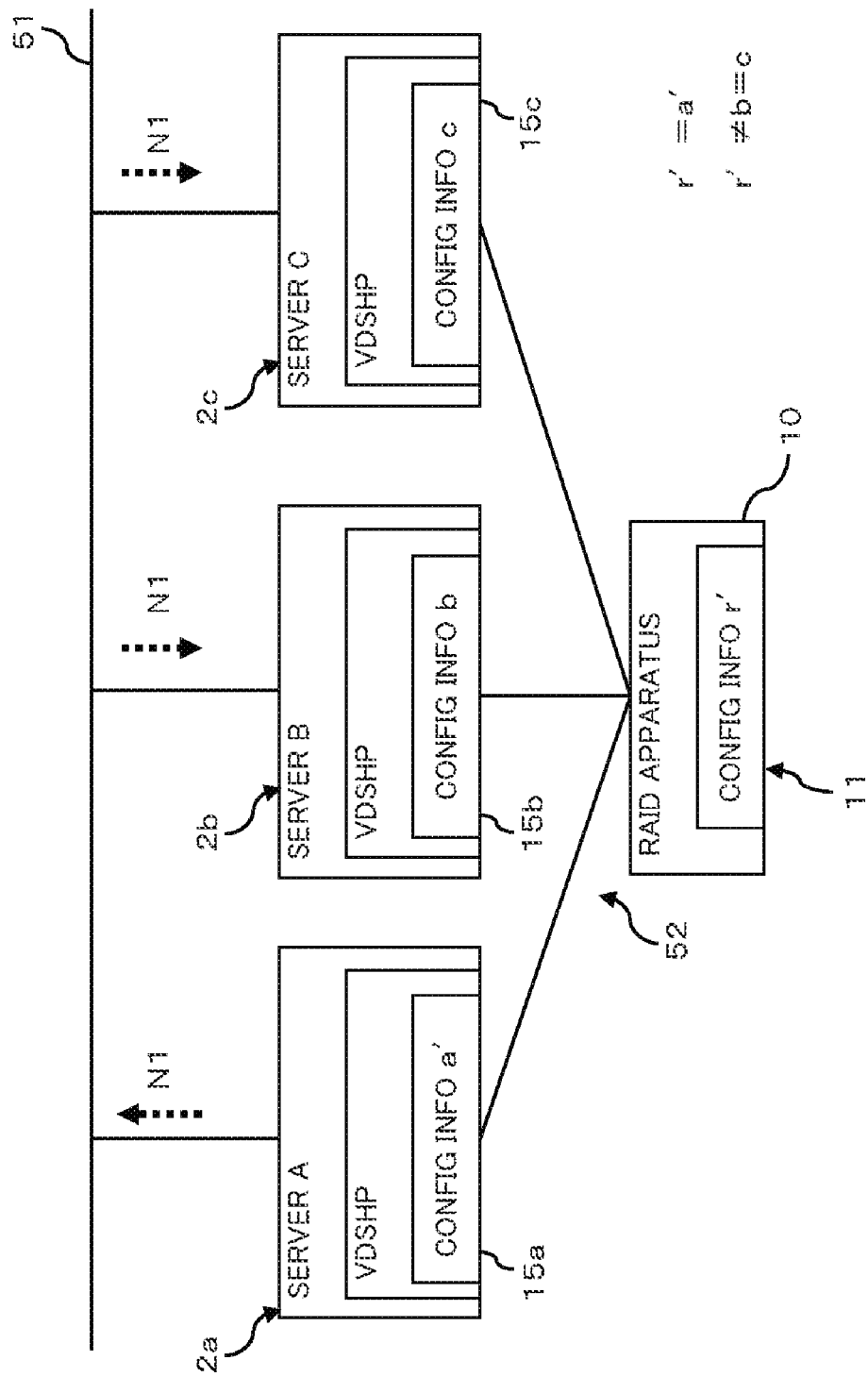
Figure 13:
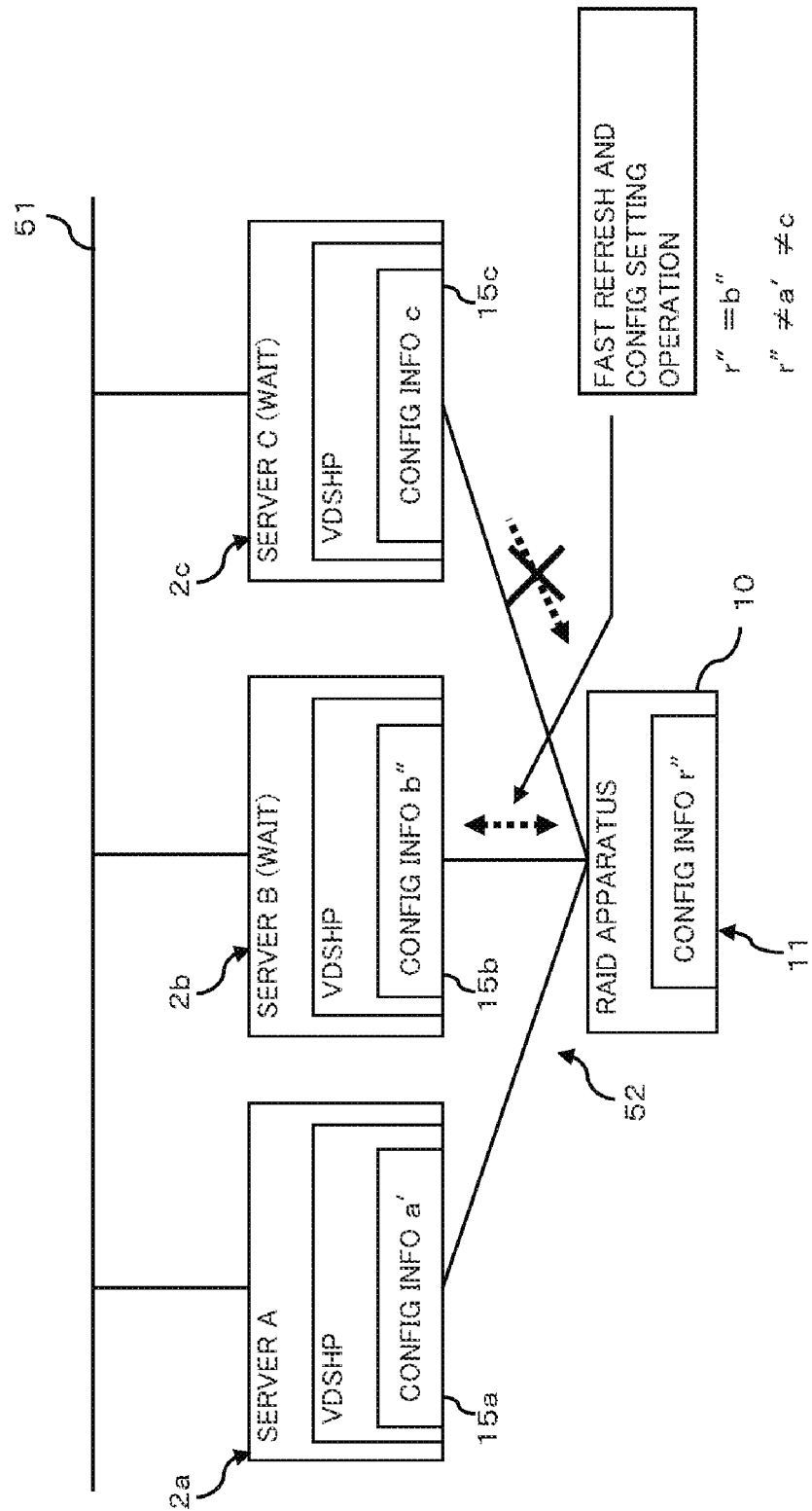

FIGS. 11-13 are diagrams illustrating configuration setting operation processing by a plurality of servers 2 in the storage system 1.

This is a scenario where the server A, B, and C attempt to execute a configuration setting operation on the RAID apparatus 10 substantially at the same timing in the storage system 1, and the server A wins an exclusive control right for the RAID apparatus 10.

As depicted in FIG. 11, when the server A wins an exclusive control right for the RAID apparatus 10, the VDSHP in the servers B and C detect that the server A is having the exclusive control right for the RAID apparatus 10 and put the servers B and C into the processing waiting state (wait).

Thereafter, the first configuration information modification section 23 of the server A modifies the configuration information 11 in the RAID apparatus 10 to r' in a communication between the server and the RAID apparatus 10 through the FC link 52, and the configuration information 15a in the server A is modified from a to a'. In other words, the following relationships hold:

$r'=a'$ $r' \neq b = c$

Thereafter, the notification section 24 of the server A notifies the other servers B and C of notification information N1 in inter-server communications through the LAN 51, as depicted in FIG. 12. More specifically, the server A sends an indication of parts which undergo the configuration setting (modified part information) to the servers B and C within the communication data. The respective VDSHPs in the servers B and C store the received modified part information in the respective modified part information storage section 25.

In response to the notification from the server A, the VDSHP in the servers B and C restore from the processing waiting state.

The servers B and C then resumes a configuration setting operation, and as depicted in FIG. 13, the server B wins the exclusive control right for the RAID apparatus 10, for example. The server B who won the exclusive control right for the RAID apparatus 10 performs refresh on areas in the configuration information 15b specified by the modified part information stored in the modified part information storage section 25. In other words, it performs a fast refresh on the configuration information 15b.

In addition, the first configuration information modification section 23 of the server B modifies the configuration information 11 in the RAID apparatus 10 to r" in a communication between the server B and the RAID apparatus 10 through the FC link 52, and the configuration information 15b in the server B is modified from b to b". In other words, the following relationships hold:

$r''=b''$ $r'' \neq a' \neq c$

On the other hand, the server C detects that the server B won the exclusive control right for the RAID apparatus 10, and puts the server C to the processing waiting state again.

Note that it is preferred that servers 2 that transition to the processing waiting state spontaneously restore from the processing waiting state without requiring any notification received, and resume a configuration setting operation. This can prevent the servers 2 that transition to the processing waiting state, for the reasons, such as network disconnection or shutdown of the servers 2, from remaining in the processing waiting state.

Figure 14:
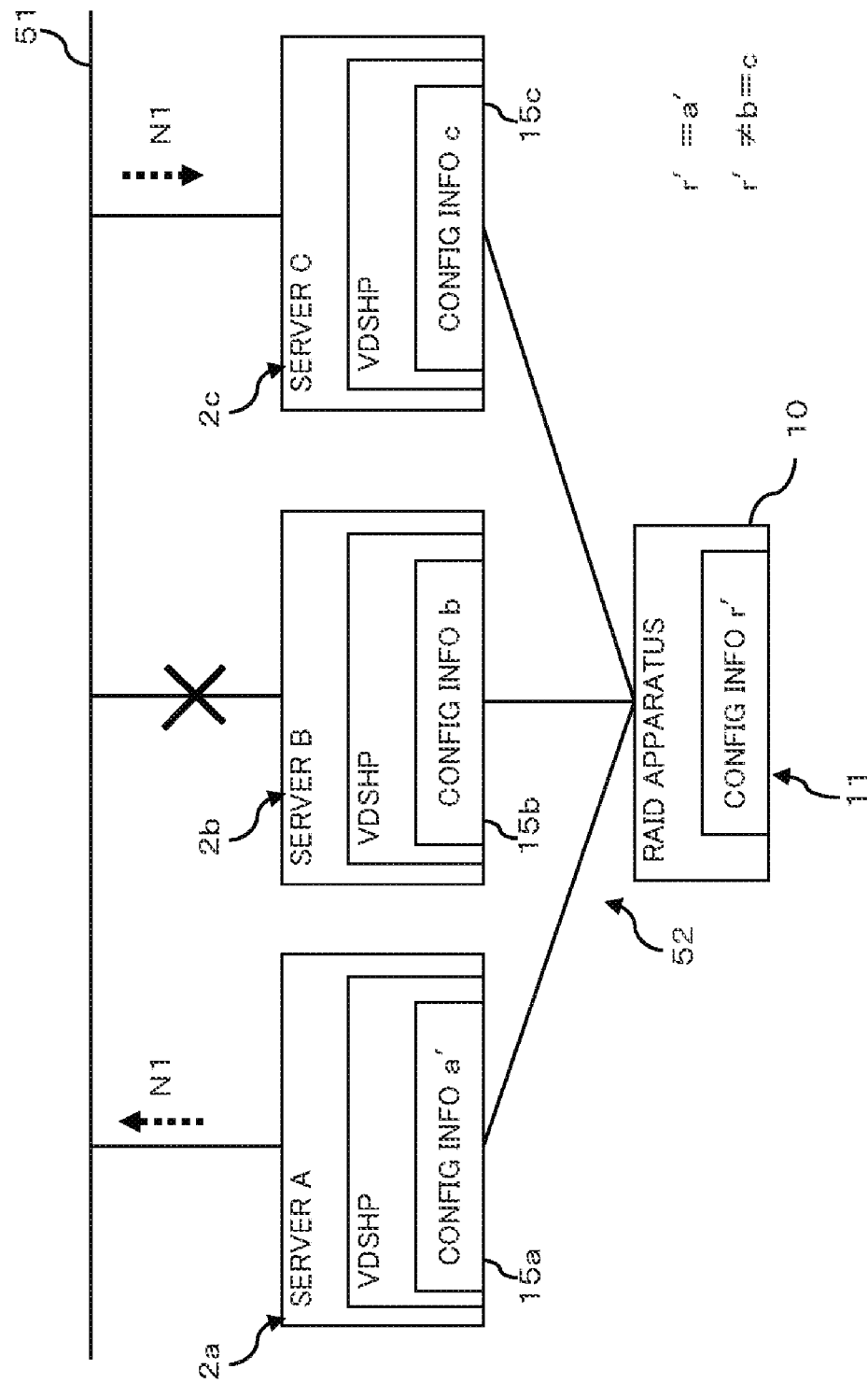
FIGS. 14-16 are diagrams illustrating processing executed when communication failure occurs among a plurality of servers in a storage system as one example of an embodiment.
Figure 15:
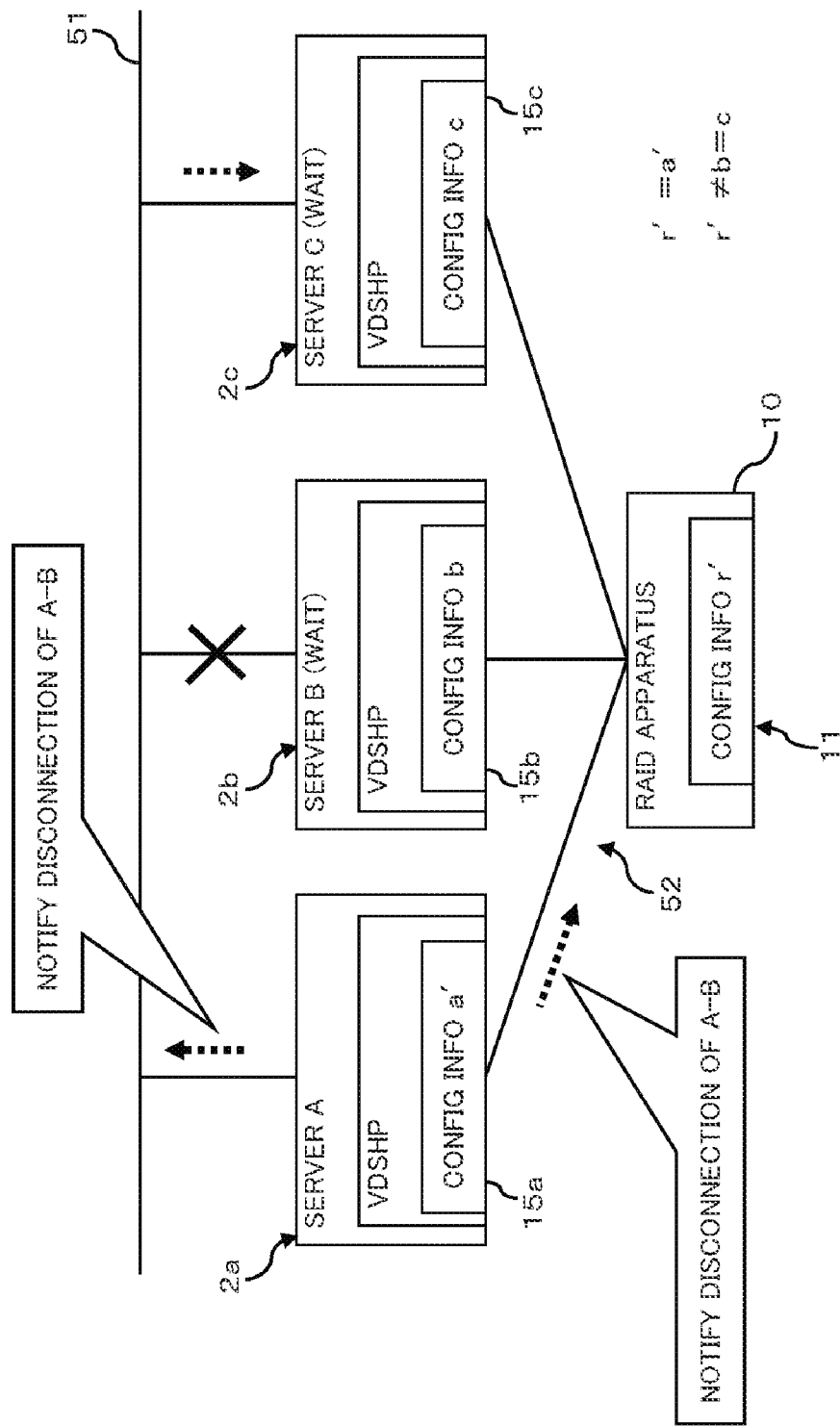
Figure 16:
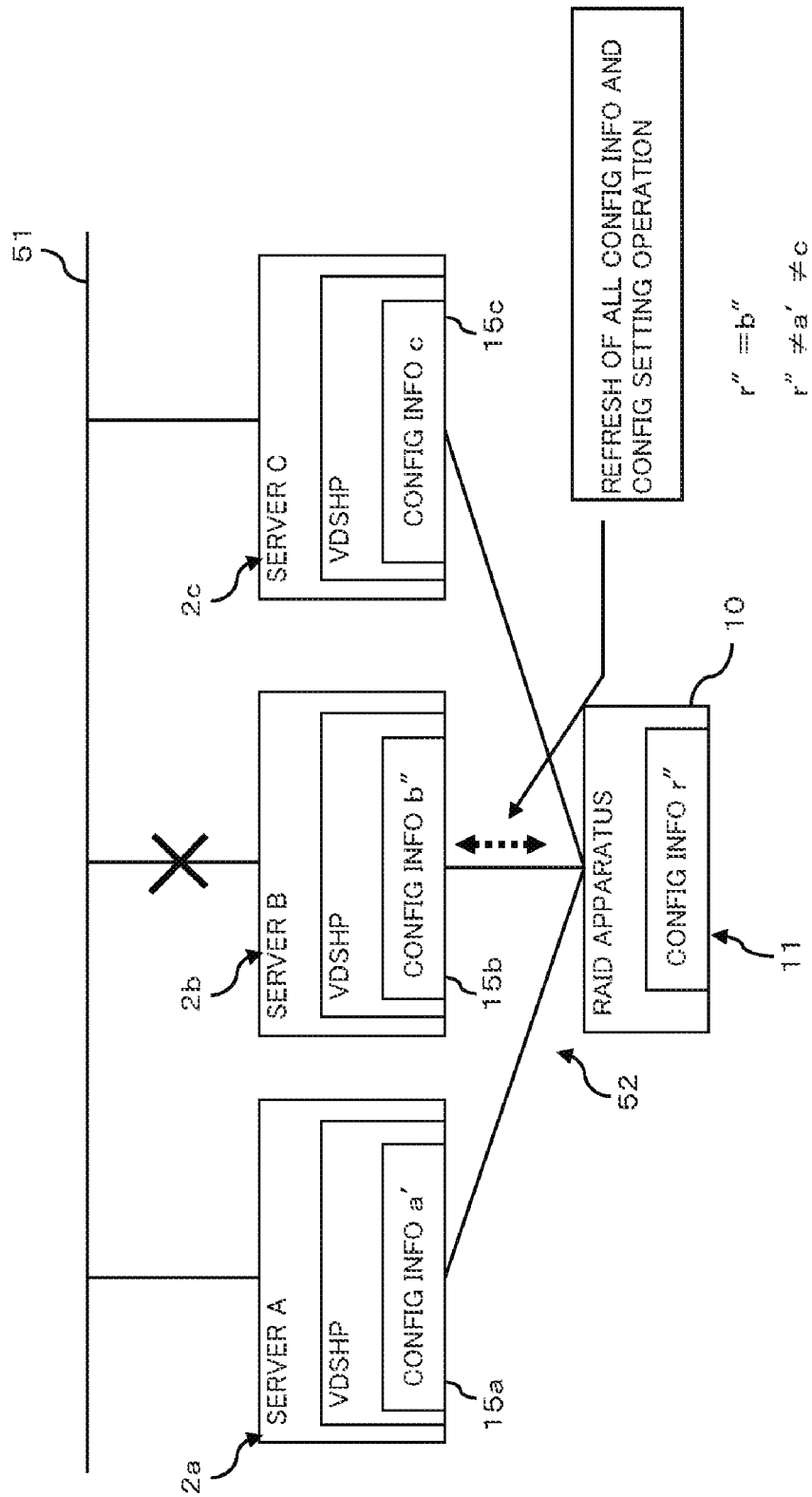

FIGS. 14-16 are diagrams illustrating processing executed when communication failure occurs among a plurality of servers in the storage system 1.

As depicted in FIG. 14, after performing a configuration setting on the RAID apparatus 10, the notification section 24 in the server A notifies the other servers B and C of notification information N1, for example. At this time, when the network between the server A and the server B (the LAN 51) is disconnected, the detection section 27 in the server A detects a network disconnection due to a communication error between the server A and the server B.

Here, the following relationships are assumed:

$r'=a'$ $r' \neq b = c$

The failure notification section 28 in the server A notifies the RAID apparatus 10 and the other server C of the network disconnection with the server B (disconnection between A and B), i.e., notification failure history information 13, as depicted in FIG. 15. The RAID apparatus 10 and the server C retain the notification failure history information 13.

Thereafter, as depicted in FIG. 16, when the server B performs a configuration setting operation on the RAID apparatus 10, the server B determines that no refresh of configuration information 15b is required since no modified part information is stored in its modified part information storage section 25. However, the notification failure history confirmation section 29 in the server B detects the disconnection between A and B by obtaining the notification failure history information 13 stored in the notification failure history information storage section 14 in the RAID apparatus 10, and performs a refresh before a configuration setting operation. At this time, the refresh is performed on the entire configuration information 15b. In other words, the following relationships hold:

$r''=b''$ $r'' \neq a' \neq c$

Preferably, diagnoses of the network status between the servers 2 are periodically made by the respective servers 2, in addition when notifying during a configuration setting operation.

Figure 17:
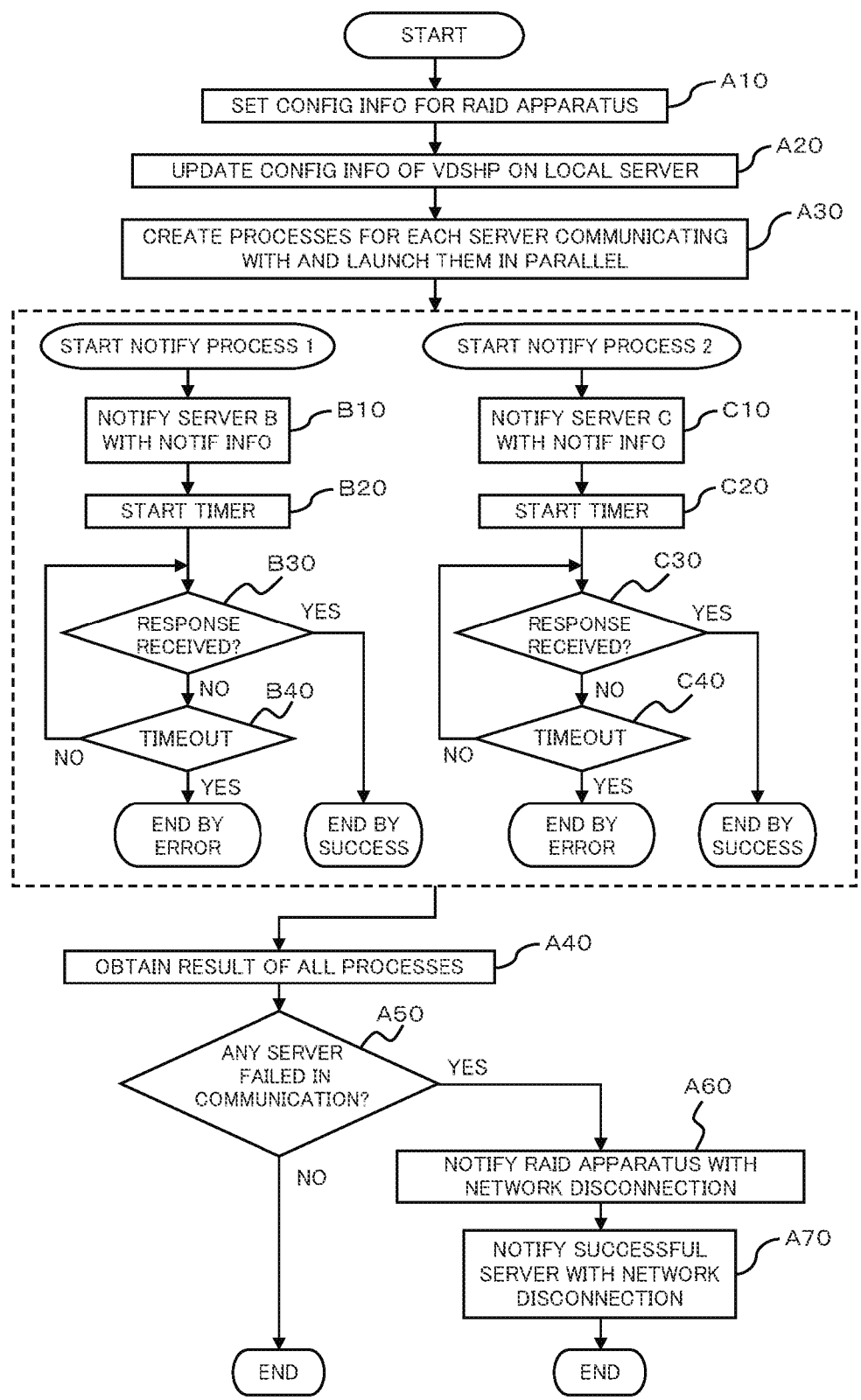
FIG. 17 is flowchart illustrating configuration setting processing for an RAID apparatus by a server A in a storage system as one example of an embodiment.

Next, processing of a configuration setting on the RAID apparatus 10 by the server A in the storage system 1 will be described with reference to the flowchart depicted in FIG. 17 (Steps A10-A70, B10-B40, and C10-C40). Note that Steps B10-B40 and C10-C40 are a flowchart for illustrating notification processes.

The server A sets configuration information for the RAID apparatus 10 using the first configuration information modification section 23 (Step A10). The server A also updates configuration information 15a for the VDSHP in the local server A (Step A20).

The server A then generates notification processes in number (two in this embodiment) corresponding to the number of the servers 2 for notifying notification information N1, and launches the notification processes in parallel (Step A30).

In this example, the server A launches a notification process 1 as a notification process for the server B, and launches a notification process 2 as a notification process for the server C.

More specifically, the notification section 24 notifies the server B of the notification information N1 (Step B10), and the detection section 27 starts a timer (Step B20). The detection section 27 then checks whether a response to the notification of the notification information N1 is received from the server B (Step B30), and when a response is received from the server B (see the YES route in Step B30), the processing ends by success. Otherwise, when no response is received from the server B (see the NO route in Step B30), the detection section 27 determines whether a certain period of time expires (is timed out) (Step B40). The detection section 27 repeats the response check in Step B30 (see the NO route in Step B40) until it is timed out. When timeout occurs (see the YES route in Step B40), the detection section 27 determines that a communication error occurs with the server B, and terminates the notification process 1 (end by error).

Similarly, the notification section 24 notifies the server C of the notification information N1 (Step C10), and the detection section 27 starts a timer (Step C20). The detection section 27 then checks whether a response to the notification of the notification information N1 is received from the server C (Step C30), and when a response is received from the server C (see the YES route in Step C30), the processing ends by success. Otherwise, when no response is received from the server C (see the NO route in Step C30), the detection section 27 determines whether a certain period of time expires (is timed out) (Step C40). The detection section 27 repeats the response check in Step C30 (see the NO route in Step C40) until it is timed out. When timeout occurs (see the YES route in Step C40), the detection section 27 determines that a communication error occurs with the server C, and terminates the notification process 2 (end by error).

Thereafter, the detection section 27 obtains the results of all of the notification processes launched in Step A30 (Step A40), and checks if there is any server 2 with which a communication error occurs in the notification process (Step A50). When there is a server 2 with which a communication error occurs in the notification process (see the YES route in Step A50), the failure notification section 28 notifies the RAID apparatus 10 of an indication of the failure of notification of the modified part information. More specifically, the failure notification section 28 notifies the RAID apparatus 10 of the network disconnection (Step A60). The failure notification section 28 also notifies the other servers 2 with which the notification process was successful (for example, the server C) of the indication of the failure of notification of the modified part information. More specifically, the failure notification section 28 notifies the server C of the network disconnection (Step A70), and terminates the processing. In contrast, when no server 2 experiences a communication error during the notification process (see the NO route in Step A50), the processing is also terminated.

Figure 18:
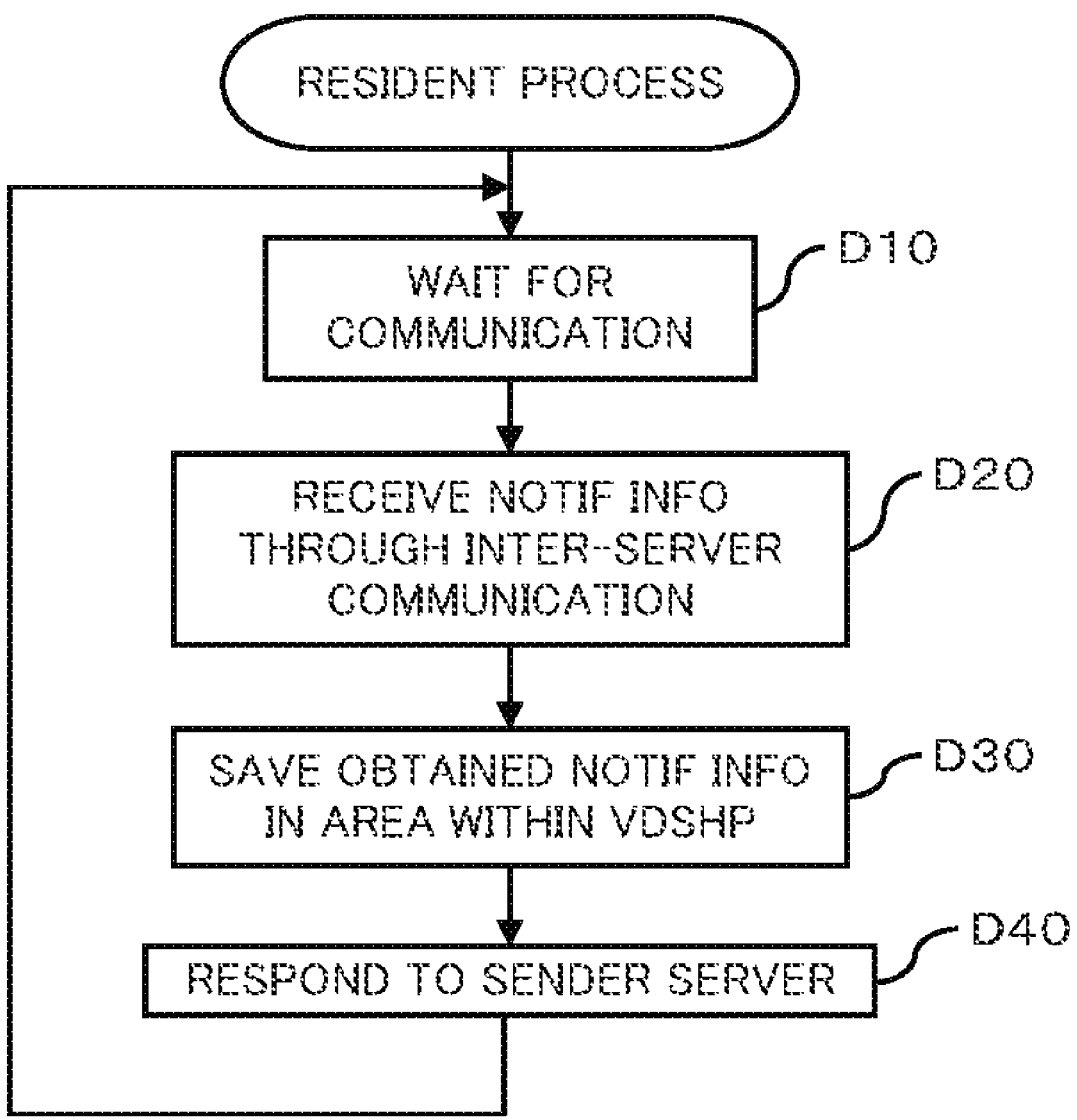
FIG. 18 is a flowchart illustrating resident processes in servers in a storage system as one example of an embodiment.

Next, resident processes in a server 2 in the storage system 1 will be described with reference to a flowchart (Steps D10-D40) illustrated in FIG. 18.

A server 2 waits for (polls) any communication (Step D10), and receives notification information N1 when another server 2 notifies notification information N1 in an inter-server communication (Step D20: modified part information obtaining step). The server 2 then stores the obtained notification information N1 in an area within the VDSHP (the modified part information storage section 25) (Step D30: storing step). The servers 2 then responds to the sender server 2 (Step D40), and goes to Step D10.

Figure 19:
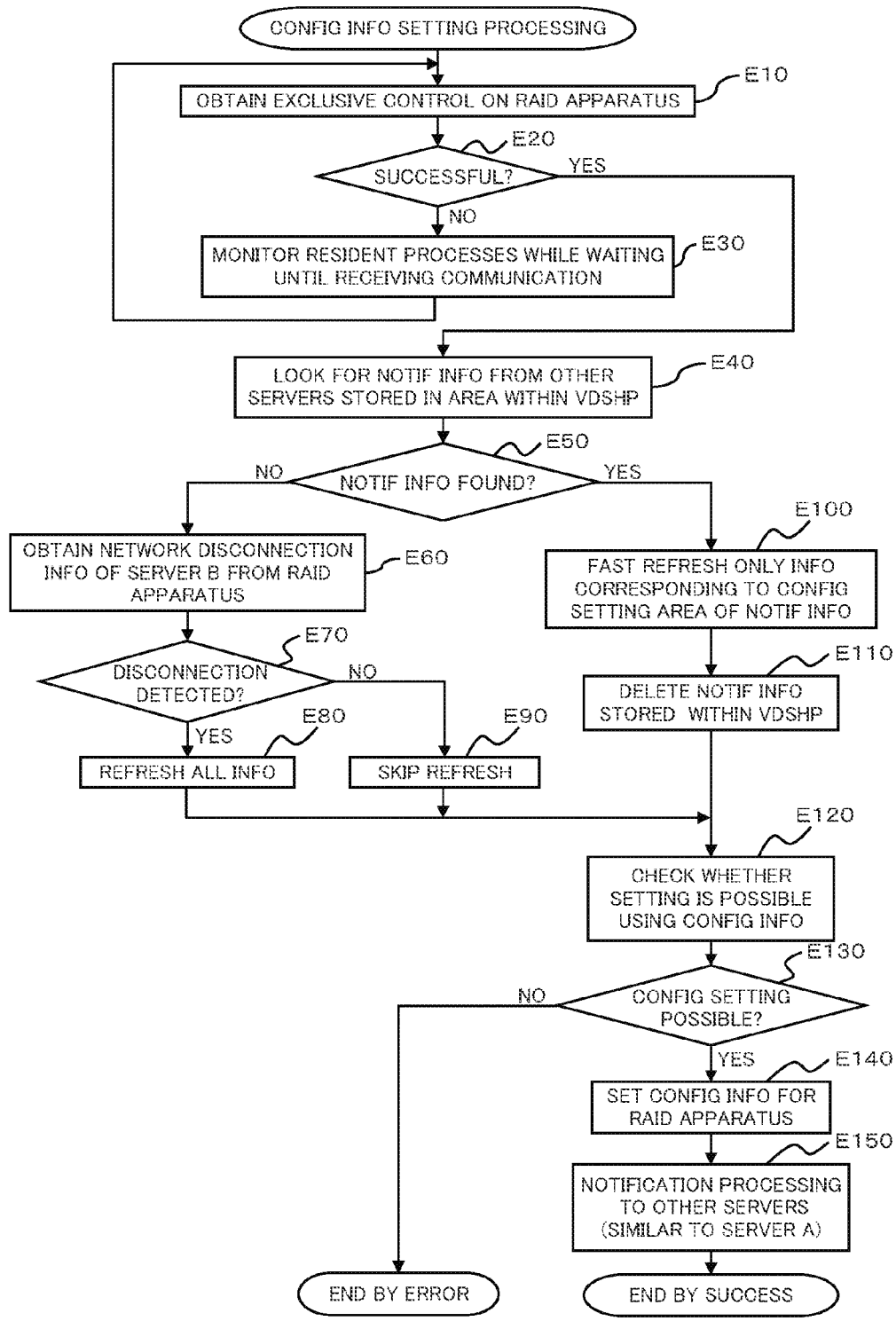
FIG. 19 is flowchart illustrating configuration setting processing for an RAID apparatus by a server B in a storage system as one example of an embodiment.
Figure 20:
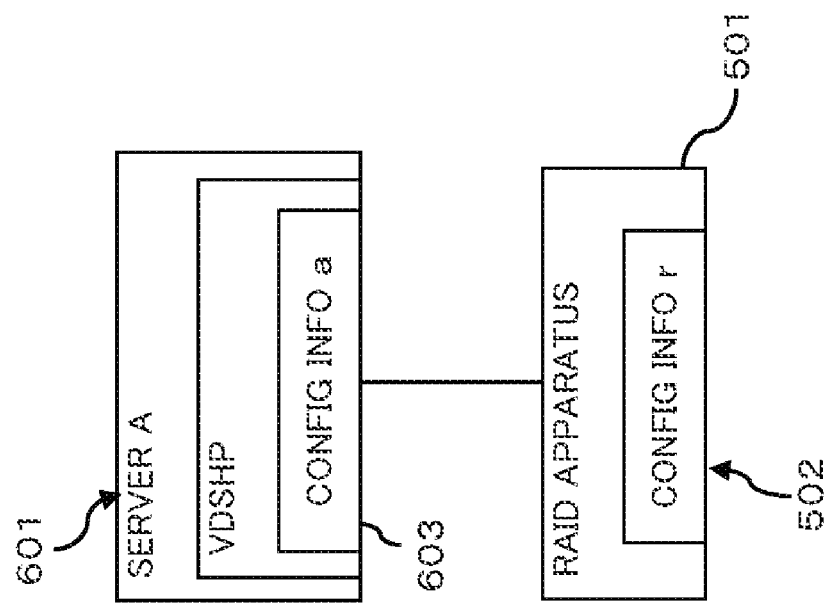
FIG. 20 is diagram illustrating an example of connection topologies of a storage system.
Figure 21:
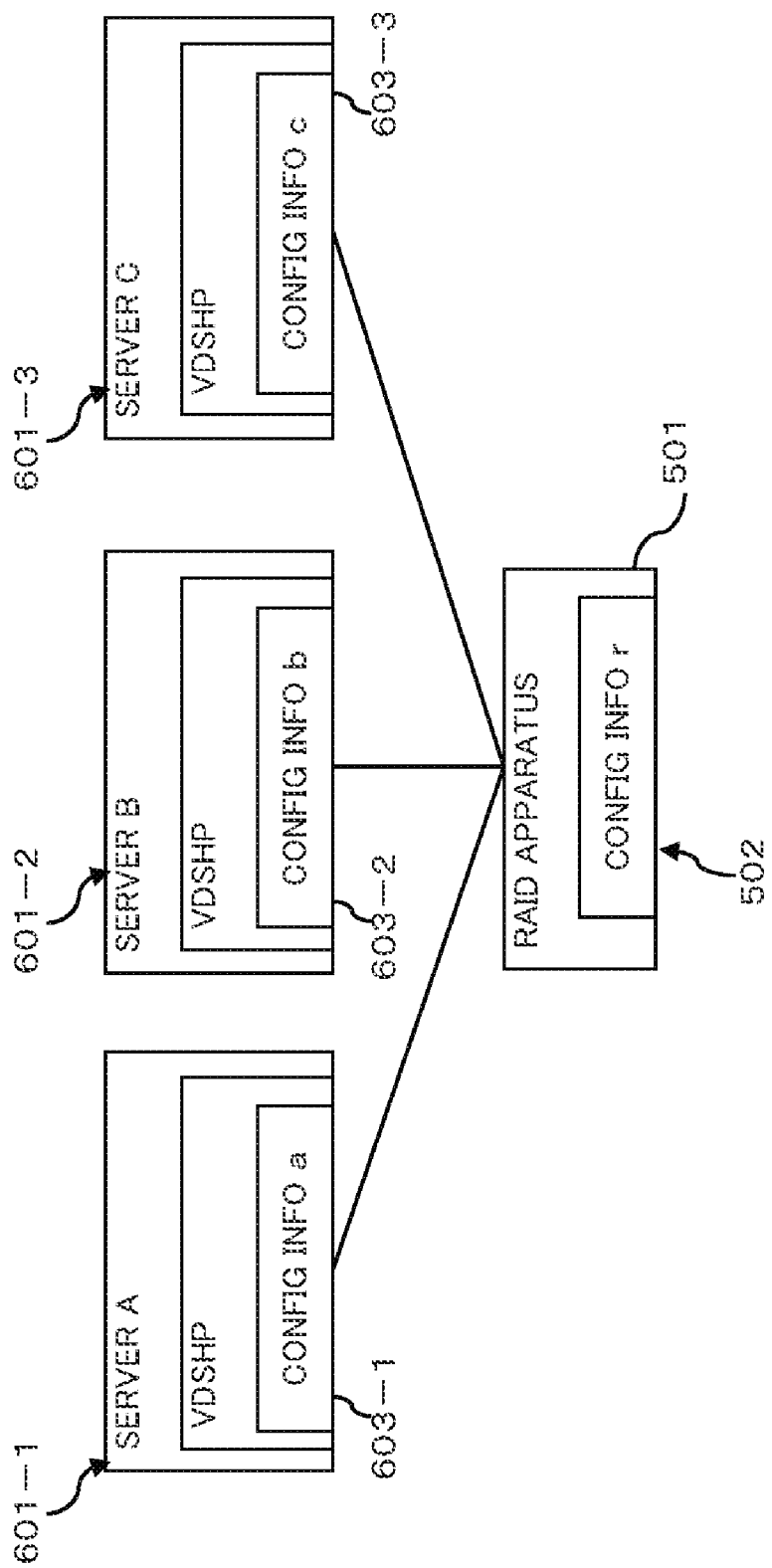
FIG. 21 is diagram illustrating an example of connection topologies of a storage system.
Figure 22:
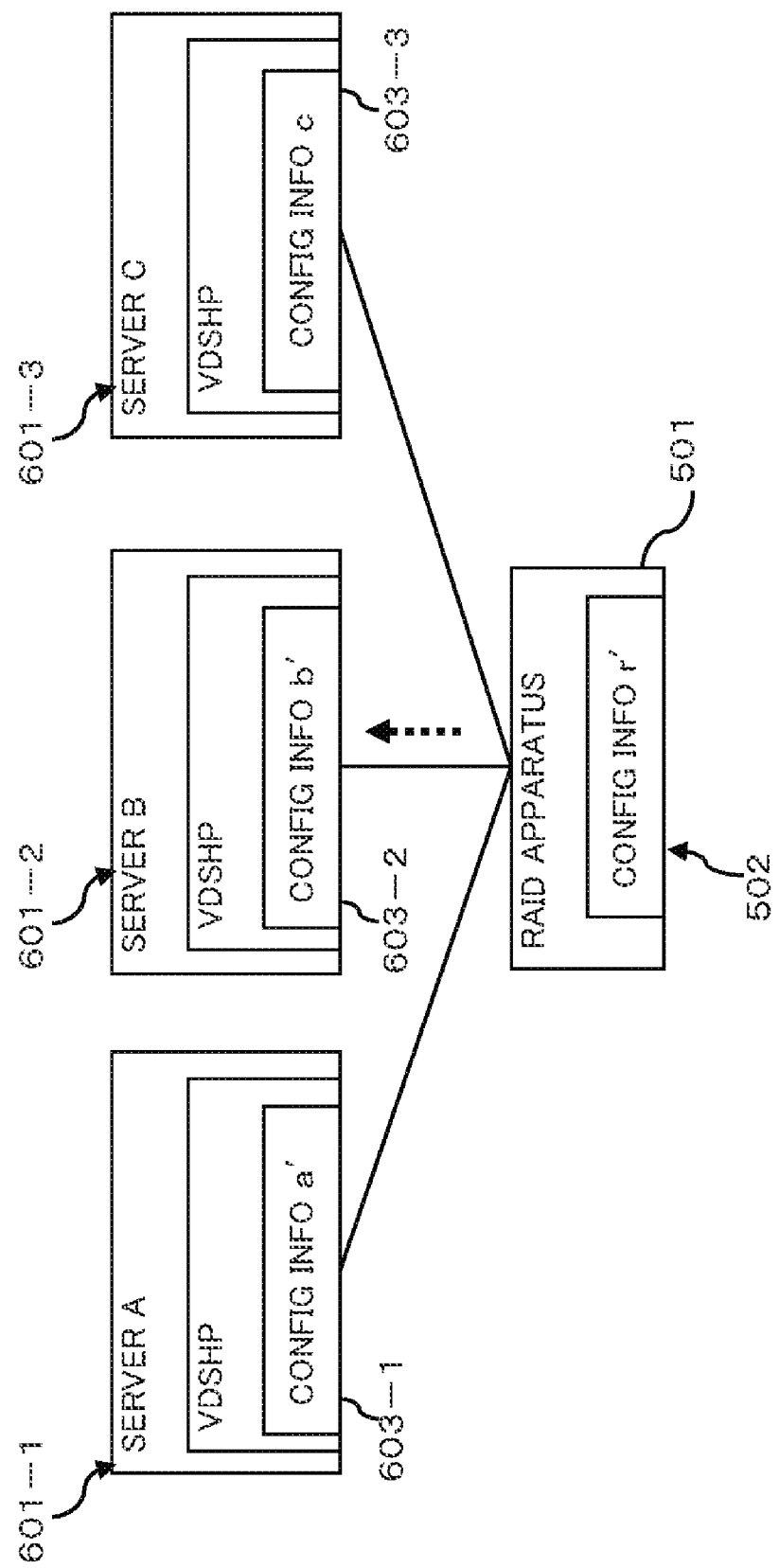
FIG. 22 is a diagram illustrating a technique for refreshing configuration information in a conventional storage system.

Next, processing of a configuration setting on the RAID apparatus 10 by the server B in the storage system 1 will be described with reference to the flowchart depicted in FIG. 19 (Steps E10-E150).

The server B attempts to obtain an exclusive control right for the RAID apparatus 10 (Steps E10 and E20). When it fails to obtain the exclusive control right (see the NO route in Step E20), the server B monitors the resident processes depicted in FIG. 18 and waits until it receives an inter-server communication (Step E30) before transitioning to Step E10.

When the server B succeeds in obtaining the exclusive control right for the RAID apparatus 10 (see the YES route in Step E20), the updating section 26 checks whether notification information N1 from the other servers 2 (the servers A and C) is stored in an area within the VDSHP, i.e., the modified part information storage section 25 (Step E40).

In the determination as of notification information N1 is stored in the modified part information storage section 25 (Step E50), when it is determined that notification information N1 is stored in the modified part information storage section 25 (see the YES route in Step E50), refresh is performed on the configuration information 15b in the second configuration information storage section 22 only for information corresponding to configuration setting area(s) in the notification information N1 (fast refresh) (Step E100: updating step). More specifically, the updating section 26 obtains only information in the configuration information 11 obtained from the RAID apparatus 10 corresponding to the configuration setting area(s) in the notification information N1. Using the obtained information, the updating section 26 then overwrites information in the configuration information 15b in the second configuration information storage section 22 corresponding to the configuration setting area(s) in the notification information N1.

Thereafter, the updating section 26 deletes the notification information N1 stored in the area within the VDSHP, i.e., the modified part information storage section 25 (Step E110).

The first configuration information modification section 23 checks whether the requested setting processing can be applicable using the configuration information 15b stored in the second configuration information storage section 22 (Step E120), and determines that the configuration setting is allowed (Step E130). When the configuration setting is allowed (see the YES route in Step E130), the first configuration information modification section 23 sets configuration information for the RAID apparatus 10 (Step E140).

In addition, the notification section 24 notifies all servers 2 connected via the LAN 51 (the servers A and C, for example) of notification information N1 representing the part of the configuration information 11 modified by the first configuration information modification section 23 (Step E150), and terminates the processing. The processing also terminates when the requested configuration setting is not applicable (see the NO route in Step E130).

In contrast, when no notification information N1 is stored in the modified part information storage section 25 (see the NO route in Step E50), the notification failure history confirmation section 29 checks whether notification failure history information 13 related to the local server 2 (the server B) is stored in the notification failure history information storage section 14 in the RAID apparatus 10 (Step E60). In other words, the notification failure history confirmation section 29 checks whether any network disconnection is detected between other servers 2 and the local server B (Step E70).

When a network disconnection is detected during this determination (see the YES route in Step E70), in other words, it is determined that notification failure history information related to the local server 2 has been stored in the notification failure history information storage section 14, the entire update section 30 refreshes the entire configuration information 15 stored in the second configuration information storage section 22 in the local server 2 using the first configuration information 11 in the RAID apparatus 10 (Step E80) and transitions to Step E120.

Otherwise, when no network disconnection is detected between any of the other servers 2 and the local server B (see the NO route in Step E70), no refresh is performed on the second configuration information storage section 22 (Step E90) and transitions to Step E120.

In summary, according to the storage system 1 as one example of this embodiment, when the server A performs a configuration setting operation on the configuration information 11 in the RAID apparatus 10, the server A notifies all of the other servers B and C connected via the LAN 51 of notification information (modified part information) N1 representing the part (s) of the configuration information 11 modified by the first configuration information modification section 23.

The servers B and C can complete refresh in a shorter time by performing fast refresh on the area (s) in the configuration information 15b and 27c specified by the modified part information stored in the modified part information storage section 25. In other words, the speed of the refreshing processing can be enhanced. At this time, on the FC links 52 between the respective servers B and C and the RAID apparatus 10, only data corresponding to modified part(s) in the configuration information 11 is communicated. This can help to reduce the data traffic on the FC links 52, thereby increasing the speed of the refreshing processing.

Furthermore, in the storage system 1, no database or apparatus specifically for managing configuration information 15 in each server 2 is required, enabling the system to be deployed and managed at lower costs.

Furthermore, when the RAID apparatus 10 is shared among a plurality of servers 2, the integrity is maintained among the first configuration information 11 in the RAID apparatus 10 and the configuration information 15 in the respective servers 2, thereby enhancing the reliability.

Furthermore, when each server 2 is modified of part information from another server 2 in an inter-server communication, instead of immediately performing a refresh, that server 2 performs refresh before performing configuration setting on the RAID apparatus 10, i.e., as a pre-processing of the configuration setting. Thereby, the need for managing refreshing processing on the RAID apparatus 10 from multiple servers 2 can be avoided.

In addition, the notification section 24 notifies the other servers B and C of modified part information through the LAN 51, which is different than the FC links 52 connecting between the RAID apparatus 10 and the respective servers 2, which also reduces the data traffics on the FC links 52, thereby increasing the speed of the refreshing processing.

Furthermore, when notification of modified part information by the notification section 24 from the server A to the server B is failed because of communication error, for example, notification failure history information 13 is stored in the notification failure history information storage section 14 in the RAID apparatus 10. In the server B, the entire update section 30 performs refresh of the entire configuration information 15b when it is determined that notification failure history information related to the local server B has been stored, before modifying first configuration information in the RAID apparatus 10. This ensures that the configuration information 15b in the server B is refreshed, thereby increasing the reliability.

The disclosed technique is not limited to the embodiments described above, and various modifications may be made without departing from the spirit of the present embodiments.

For example, although the above-described embodiment has been described with reference to the example where three servers 2a, 2b, and 2c (servers A, B, and C) are provided in the storage system 1, this is not limiting. Two or less, or four or more servers 2 may be provided and these servers 2 are respectively connected to the RAID apparatus 10.

In addition, although the above-described embodiment has been described with reference to the example where a single RAID apparatus 10 is provided in the storage system 1, this is not limiting. The system can be equally practiced by providing two or more RAID apparatuses 10.

Furthermore, although the above-described embodiment has been described with reference to the example where the RAID control section 10 has a hardware RAID configuration which processes computations by means of hardware, this is not limiting. The RAID control section 10 may have a software RAID configuration which processes computations by means of software.

In addition, although a LAN is used as the second communication link 51 communicatively connecting a plurality of servers 2 in the above-described embodiment, this is not limiting. Various communication techniques other than the LAN may be used. Furthermore, the notification section 24, the detection section 27, the failure notification section 28, and the like may be embodied by using various functions in accordance with the selected communication technique.

Similarly, FC links are used as the first communication links 52 communicatively connecting between a plurality of servers 2 and the RAID apparatus in the above-described embodiment, this is not limiting. Various communication techniques other than the FC links may be used. Furthermore, the failure notification section 24 and the like may be embodied by using various functions in accordance with the selected communication technique.

In addition, although the functions of the first configuration information modification section 23 and the like are embodied using the functions of the VDSHP in the servers 2 in the above-described embodiment, this is not limiting. The functions of each section in the servers 2 may be embodied using the functions any other technique than the VDSHP.

The processing method, the storage system, the information processing apparatus, and the program that are disclosed may provide at least one of the following advantageous effects or advantages:

(1) Refresh can be completed in a shorter time.

(2) The data traffics between the information processing apparatus and the storage apparatus can be reduced.

(3) The system can be deployed and managed at lower costs.

(4) When the storage apparatus is shared among a plurality of information processing apparatuses, the integrity of the configurations is maintained among the first configuration information in the storage apparatus and the second configuration information in the respective information processing apparatuses, thereby enhancing the reliability.

(5) Managing refreshing processing on the storage apparatus from multiple information processing apparatuses can be avoided.

(6) It is ensured that the second configuration information in the information processing apparatuses is refreshed, thereby increasing the reliability.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the this embodiment(s) of the present inventions have been described in detail, it should be understood that the various changes, substitutions, and alterations could be made hereto without departing from the spirit and scope of the invention.

What is claimed is:

1. A processing method in a storage system comprising a storage apparatus that stores data and executes processing on the data on the basis of first configuration information stored in a first configuration information storage section, and a plurality of information processing apparatuses that are connected to the storage apparatus via a first communication link, each information processing apparatus comprising a second configuration information storage section that stores second configuration information being a duplicate of the first configuration information, and each information processing apparatus being capable of modifying the first configuration information, the method comprising:

modifying, by a first information processing apparatus of the plurality of information processing apparatuses, the first configuration information in the storage apparatus;

notifying, by the first information processing apparatus, a second information processing apparatus of the plurality of information processing apparatuses in the storage system, of modified part information indicating a modified part in the first configuration information modified during the modifying, the second information processing apparatus being different from the first information processing apparatus and being connected to via a second communication link different from the first communication link;

in response to being notified with the modified part information, storing, by the second information processing apparatus, the modified part information in a modified part information storage section; and prior to modifying the first configuration information in the storage apparatus, updating, by the second information processing apparatus, the modified part in the second configuration information indicated by the modified part information stored in the modified part information storage section, on the basis of the first configuration information.

2. The processing method according to claim 1, further comprising:

detecting, by the first information processing apparatus, a failure of a notification to the second information processing apparatus about the modified part information;

in response to the detecting a failure of a notification to the second information processing apparatus about the modified part information, notifying, by the first information processing apparatus, the storage apparatus with the failure of the notification to the second information processing apparatus about the modified part information, via the first communication link;

in response to being notified with the failure of the notification to the second information processing apparatus about the modified part information, storing, in the storage apparatus, information on the second information processing apparatus, to which the modified part information has been notified, in a notification failure history information storage section, as a notification failure history information;

prior to modifying the first configuration information in the storage apparatus, determining, by the second information processing apparatus, whether or not notification failure history information about the second information processing apparatus has been stored in the notification failure history information storage section; and in response to the second information processing apparatus determining that notification failure history information about the second information processing apparatus has been stored, entirely updating the entire second configuration information in the second information processing apparatus using the first configuration information in the storage apparatus.

3. A storage system comprising:

a storage apparatus that stores data and executes processing on the data on the basis of first configuration information stored in a first configuration information storage section; and a plurality of information processing apparatuses connected to the storage apparatus via a first communication link, a first information processing apparatus of the plurality of information processing apparatuses comprising:

a second configuration information storage section adapted to store second configuration information being a duplicate of the first configuration information;

a first configuration information modification section adapted to modify first configuration information in the storage apparatus;

a notification section adapted to notify, a second information processing apparatus of the plurality of information processing apparatuses in the storage system, of modified part information indicating a modified part in the first configuration information modified by the first configuration information modification section, the second information processing apparatus being connected to via a second communication link different from the first communication link and being different from the first information processing apparatus;

a modified part information storage section adapted to store the modified part information notified by the second information processing apparatus; and an updating section adapted to update, prior to modifying the first configuration information in the storage apparatus, the modified part in the second configuration information indicated by the modified part information stored in the modified part information storage section, on the basis of the first configuration information.

4. The storage system according to claim 3, wherein the first information processing apparatus of the plurality of information processing apparatuses further comprises:

a detection section adapted to detect a failure of a notification to the second information processing apparatus about the modified part information;

a failure notification section adapted to notify, in response to the detection section detecting a failure of a notification to the second information processing apparatus about the modified part information, the storage apparatus with the failure of the notification to the second information processing apparatus about the modified part information;

a notification failure identification section adapted to determine, prior to modifying the first configuration information in the storage apparatus, whether or not notification failure history information about the second information processing apparatus has been stored in the storage apparatus; and a entire update section adapted to entirely update, in response to the notification failure identification section determining that notification failure history information about the second information processing apparatus has been stored, the entire second configuration information in the second information processing apparatus using the first configuration information in the storage apparatus, and the storage apparatus comprises:

a notification failure information history information storage section adapted to store, in response to the failure notification section notifying the storage apparatus with the failure of the notification to the second information processing apparatus about the modified part information, information on the second information processing apparatus, to which the modified part information has been notified, as a notification failure history information.

5. An information processing apparatus connected, via a first communication link, to a storage apparatus that executes processing on data on the basis of first configuration information stored in a first configuration information storage section, the information processing apparatus comprising:
- a second configuration information storage section adapted to store second configuration information being a duplicate of the first configuration information;
- a first configuration information modification section adapted to modify first configuration information in the storage apparatus;
- a notification section adapted to notify a second information processing apparatus connected via a second communication link of modified part information indicating a modified part in the first configuration information modified by the first configuration information modification section;
- a modified part information storage section adapted to store the modified part information notified by the second information processing apparatus; and
- an updating section adapted to update, prior to modifying the first configuration information in the storage apparatus, the modified part in the second configuration information indicated by the modified part information stored in the modified part information storage section, on the basis of the first configuration information.

6. The information processing apparatus according to claim 5, further comprising:
- a detection section adapted to detect a failure of a notification to the second information processing apparatus about the modified part information;
- a failure notification section adapted to notify, in response to the detection section detecting a failure of a notification to the second information processing apparatus about the modified part information, the storage apparatus with the failure of the notification to the second information processing apparatus about the modified part information;
- a notification failure identification section adapted to determine, prior to modifying the first configuration information in the storage apparatus, whether or not notification failure history information about the second information processing apparatus has been stored in the storage apparatus; and
- a entire update section adapted to entirely update, in response to the notification failure identification section determining that notification failure history information about the second information processing apparatus has been stored, the entire second configuration information in the second information processing apparatus using the first configuration information in the storage apparatus.

7. A computer-readable storage medium storing a program, the program makes a computer that is connected, via a first communication link, to a storage apparatus that executes processing on data on the basis of first configuration information stored in a first configuration information storage section, when executed, the program making the computer to function as:
- a second configuration information storage section adapted to store second configuration information being a duplicate of the first configuration information;
- a first configuration information modification section adapted to modify first configuration information in the storage apparatus;
- a notification section adapted to notify a second information processing apparatus connected via a second communication link of modified part information indicating a modified part in the first configuration information modified by the first configuration information modification section;
- a modified part information storage section adapted to store the modified part information notified by the second information processing apparatus; and
- an updating section adapted to update, prior to modifying the first configuration information in the storage apparatus, the modified part in the second configuration information indicated by the modified part information stored in the modified part information storage section, on the basis of the first configuration information.

8. The computer readable storage medium according to claim 7, wherein the program further makes the computer to function as:
- a detection section adapted to detect a failure of a notification to the second information processing apparatus about the modified part information;
- a failure notification section adapted to notify, in response to the detection section detecting a failure of a notification to the second information processing apparatus about the modified part information, the storage apparatus with the failure of the notification to the second information processing apparatus about the modified part information;
- a notification failure identification section adapted to determine, prior to modifying the first configuration information in the storage apparatus, whether or not notification failure history information about the second information processing apparatus has been stored in the storage apparatus; and
- a entire update section adapted to entirely update, in response to the notification failure identification section determining that notification failure history information about the second information processing apparatus has been stored, the entire second configuration information in the second information processing apparatus using the first configuration information in the storage apparatus.

* * * * *

UNITED STATES PATENT AND TRADEMARK OFFICE
CERTIFICATE OF CORRECTION

PATENT NO. : 8,381,029 B2
APPLICATION NO. : 12/900381
DATED : February 19, 2013
INVENTOR(S) : Yuichi Koshiyama It is certified that error appears in the above-identified patent and that said Letters Patent is hereby corrected as shown below:

On the Title Page, Item (73) Assignee information should be corrected as shown below:

-- (73)  Assignee: Fujitsu Limited, Kawasaki (JP) --

Signed and Sealed this
Fourteenth Day of May, 2013

Teresa Stanek Rea
*Acting Director of the United States Patent and Trademark Office*